United States Patent
Lawes et al.

(10) Patent No.: US 12,407,010 B2
(45) Date of Patent: Sep. 2, 2025

(54) HYDROGEN RECIRCULATION VENTURI ARRAY FOR OPTIMIZED H2 UTILIZATION

(71) Applicant: ZEROAVIA LTD, Cirencester (GB)

(72) Inventors: Stephen Lawes, Cirencester (GB); Gareth Coates, Cirencester (GB)

(73) Assignee: ZEROAVIA LTD, Cirencester (GB)

( * ) Notice: Subject to any disclaimer, the term of this patent is extended or adjusted under 35 U.S.C. 154(b) by 0 days.

(21) Appl. No.: 18/873,440

(22) PCT Filed: Jun. 12, 2023

(86) PCT No.: PCT/US2023/025071
§ 371 (c)(1),
(2) Date: Dec. 10, 2024

(87) PCT Pub. No.: WO2024/054277
PCT Pub. Date: Mar. 14, 2024

(65) Prior Publication Data
US 2025/0174688 A1    May 29, 2025

Related U.S. Application Data

(63) Continuation-in-part of application No. 18/162,559, filed on Jan. 31, 2023, now Pat. No. 11,876,263.

(30) Foreign Application Priority Data

Jun. 10, 2022 (GB) .................................. 2208554
Jul. 18, 2022 (GB) .................................. 2210512
Jul. 21, 2022 (GB) .................................. 2210694

(51) Int. Cl.
*H01M 8/04* (2016.01)
*B60L 1/00* (2006.01)
(Continued)

(52) U.S. Cl.
CPC ......... *H01M 8/04753* (2013.01); *B60L 1/003* (2013.01); *B60L 50/70* (2019.02);
(Continued)

(58) Field of Classification Search
CPC ........... H01M 8/04753; H01M 8/0265; H01M 8/04097; H01M 8/0656
See application file for complete search history.

(56) References Cited

U.S. PATENT DOCUMENTS

2004/0229087 A1* 11/2004 Senner ............... H01M 8/04119
429/454
2005/0064255 A1    3/2005 Blaszczyk et al.
(Continued)

FOREIGN PATENT DOCUMENTS

DE    102020215518 A1    6/2002
JP    2002216811 A    8/2002
(Continued)

OTHER PUBLICATIONS

International Search and Written Opinion issued in PCT/US2023/025071, dated Aug. 26, 2024, 17 pages
(Continued)

*Primary Examiner* — Olatunji A Godo
(74) *Attorney, Agent, or Firm* — HAYES SOLOWAY P.C.

(57) ABSTRACT

An integrated hydrogen-electric engine includes a hydrogen fuel-cell; a hydrogen fuel source; an electric motor assembly disposed in electrical communication with the fuel-cell; an air compressor system configured to be driven by the motor assembly, and a cooling system having a heat exchanger radiator in a duct of the cooling system, and configured to direct an air stream including an air stream from the air compressor through the radiator, wherein an exhaust stream
(Continued)

from a cathode side of the fuel-cell is fed via a flow control nozzle into the air stream in the cooling duct downstream of the radiator.

9 Claims, 29 Drawing Sheets

(51) Int. Cl.
  *B60L 50/70* (2019.01)
  *B64D 27/34* (2024.01)
  *B64D 27/355* (2024.01)
  *H01M 8/0265* (2016.01)
  *H01M 8/04089* (2016.01)
  *H01M 8/04746* (2016.01)
  *H01M 8/0656* (2016.01)

(52) U.S. Cl.
  CPC .......... *B64D 27/34* (2024.01); *B64D 27/355* (2024.01); *H01M 8/0265* (2013.01); *H01M 8/04097* (2013.01); *H01M 8/0656* (2013.01); *B60L 2200/10* (2013.01)

(56) References Cited

U.S. PATENT DOCUMENTS

| | | |
|---|---|---|
| 2005/0130008 A1 | 6/2005 | Uozumi |
| 2010/0178591 A1 | 7/2010 | Lamm |
| 2021/0151783 A1 | 5/2021 | Miftakhov |

FOREIGN PATENT DOCUMENTS

| | | |
|---|---|---|
| KR | 20100026770 | 3/2010 |
| WO | 2004038838 A2 | 5/2004 |
| WO | 2008092545 A1 | 8/2008 |
| WO | 2020215113 A1 | 10/2020 |
| WO | 2022122247 A1 | 6/2022 |

OTHER PUBLICATIONS

Examination Report issued in related GB Appln. Serial No. 22085542, dated Jan. 16, 2023, 2 pages
Combined Search and Examination Report issued in related GB Appln. Serial No. 2208554.2, dated Aug. 18, 2022, 5 pages.

* cited by examiner

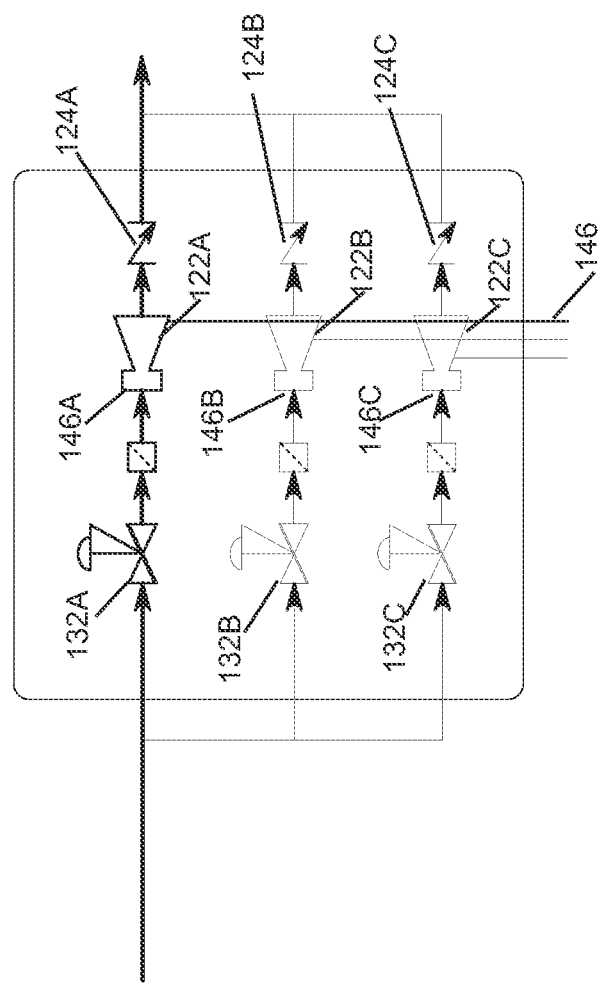

HYDROGEN RECIRCULATION VENTURI ARRAY FOR OPTIMIZED H2 UTILIZATION

The present disclosure relates to integrated hydrogen fuel-cell electric engine systems. The disclosure has particular utility to hydrogen fuel-cell electric engines for use with transport vehicles including aircraft and will be described in connection with such utility, although other utilities including terrestrial transport vehicles and watercraft are contemplated.

This section provides background information as it relates to the present disclosure which is not necessarily prior art. This section provides a general summary of the disclosure and is not a comprehensive disclosure of its full scope or all of its features.

Exhaust emissions from transport vehicles are a significant contributor to climate change. Conventional fossil-fuel-powered terrestrial transport vehicles, watercraft and aircraft release $CO_2$ emissions. Also, conventional fossil-fuel-powered aircraft emissions include non-$CO_2$ effects due to nitrogen oxide (NOx), vapor trails and cloud formation triggered by the altitude at which aircraft operate. These non-$CO_2$ effects are believed to contribute twice as much to global warming as aircraft $CO_2$ and are estimated to be responsible for two-thirds of aviation's climate impact.

Rechargeable battery-powered terrestrial vehicles, i.e., "EVs," are slowly replacing conventional fossil-fuel-powered terrestrial vehicles. However, the weight and limited energy storage of batteries makes rechargeable battery-powered aircraft generally impractical.

Hydrogen fuel-cells offer an attractive alternative to fossil-fuel-burning engines. Hydrogen fuel-cell tanks may be quickly filled and store significant energy, and other than the relatively small amount of unreacted hydrogen gas, the exhaust from hydrogen fuel-cells comprises only water.

A fuel-cell is an electrochemical device that converts chemical energy produced by a reaction directly into electrical energy. A typical hydrogen fuel-cell includes a polymer electrolyte membrane (PEM), often called a proton exchange membrane, that permits only protons to pass between an anode and a cathode of the fuel-cell. At the anode, diatomic hydrogen (a fuel) is reacted to produce hydrogen protons that pass through the PEM. The electrons produced by this reaction travel through circuitry that is external to the fuel-cell to form an electrical current. At the cathode, oxygen is reduced and reacts with the hydrogen protons to form water. The anodic and cathodic reactions are described by the following equations:

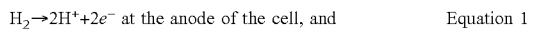

$H_2 \rightarrow 2H^+ + 2e^-$ at the anode of the cell, and    Equation 1

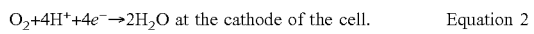

$O_2 + 4H^+ + 4e^- \rightarrow 2H_2O$ at the cathode of the cell.    Equation 2

Referring to FIG. 1, a typical hydrogen fuel-cell 10 comprises a housing 12 containing an anode 14, and a cathode 16 sandwiching a proton exchange membrane 18. A hydrogen fuel inlet 20 and a hydrogen recycling outlet 22 are provided on the anode side of the housing 12. An oxygen inlet 24 and a reaction product, i.e., water outlet 26, are provided on the cathode side of the housing 10. The anode side and cathode side of the membrane 18 are coated with suitable reaction catalysts 19A, 19B.

Located in the hydrogen fuel inlet 20 is a hydrogen gas injector 28 which includes a venturi nozzle 30 having a hydrogen gas recirculation inlet 32 for drawing unconsumed gaseous hydrogen back to the hydrogen fuel inlet supply.

Anodic reaction according to Equation 1 as described above occurs at the anode side of the cell, while a cathodic reaction as described in Equation 2 occurs at the cathode side of the cell providing a flow of electricity 29.

Venturis are widely used passive devices that utilize restriction within the flow path to vary the flow characteristics of a fluid. As the geometry increases the fluid's velocity, there is a corresponding drop in pressure. This negative pressure can then be used to draw a secondary fluid into the primary flow. In fuel-cells the negative pressure is used to assist with the process of hydrogen recirculation, drawing unconsumed hydrogen from the fuel-cell exhaust back around into the inlet supply. Passive recirculation venturis (as opposed to active pumps) are widely used with existing fuel-cell systems.

When designing the internal injection nozzle within the venturi several things must be considered including:

The jet speed of the primary media should be as high as possible to generate the greatest delta pressure and provide the greatest recirculation suction; and One must consider the greatest mass flow required by the system and design the internal nozzle so that the primary media velocity is subsonic. Greater than Mach 1 turbulent flow of the primary media can occur, reducing suction and potentially generating ice crystals within some media types, leading to potential blockages.

In the case of a hydrogen fuel-cell-powered aircraft, maximum hydrogen gas flow requirement is at take-off, where, for example, hydrogen fuel-cell stack architecture might consume in the region of around 9 grams/sec @600 A. This maximum hydrogen gas flow requirement only exists during the period of take-off, and as such the turn-down in suction that the venturi will experience when the fuel-cell system is pulled back to minimum cruise power, for example circa 270 A, will be significantly reduced. Conversely, designing for lower cruise limit requirements (270 A) is not practical since the higher flow rate take-off point will violate the requirement described above of maintaining the velocity of the primary media to subsonic. Therefore, a single fixed geometry venturi cannot be designed for all duty cycle operating conditions.

In order to overcome the aforesaid and other problems of the prior art, in one embodiment we provide a hydrogen fuel-cell system hydrogen gas inlet which includes a hydrogen gas recirculation comprising:

a) a plurality of venturis; and b) one or more valves configured to control flow of hydrogen gas to the plurality of venturis, wherein the one or more valves are configured to selectively open and close to control flow of the hydrogen gas through the venturis to a speed below the speed of sound, i.e., subsonic, and above the speed where venturi icing occurs.

In one embodiment the hydrogen gas recirculation system includes a digital controller configured to control the selective opening and closing of the one or more valves. In such embodiment the venturis may include a mechanical linkage connecting throttle plates venturis to one another.

In another embodiment the plurality of venturis may be similarly sized. Alternatively the plurality of venturis may be sized differently from one another. When the plurality of venturis is sized differently from one another, in a preferred embodiment the plurality of differently sized venturis may be configured to open in sequence from smaller to larger, and vice versa.

In yet another embodiment, the valves comprise proportional valves.

In still yet another embodiment, the plurality of venturis are connected in parallel.

In still yet another embodiment the hydrogen gas recirculating system also includes a water separator upstream of the recirculating hydrogen gas. In such embodiment the water separator preferably comprises a cyclonic water separator.

The present disclosure also provides a hydrogen fuel-cell system including a hydrogen gas recirculation system as above described, and including:

a) a plurality of venturis; and
b) one or more valves configured to control flow of hydrogen gas to the plurality of venturis, wherein the one or more valves are configured to selectively open and close to optimize flow of the hydrogen gas through the venturis to a speed below the speed of sound, i.e., subsonic and above the speed where venturi icing occurs.

In still yet another embodiment there is provided a hydrogen fuel-cell-powered aircraft comprising at least one electric motor, and a hydrogen fuel-cell system comprising a plurality of venturis as above described, and hydrogen gas recirculation system.

The present disclosure also provides a method for operating the hydrogen gas fuel-cell system powered aircraft through the stages of take-off and climb, cruise, and descent and landing, wherein the hydrogen fuel-cell system includes a hydrogen fuel-cell including a hydrogen gas recirculation system as above described, and including a plurality of venturis, and one or more valves configured to control flow of hydrogen gas to the plurality of venturis comprising controlling the venturis to optimize hydrogen gas flow during take-off and climb, to a speed below the speed of sound and above the speed where venturi icing occurs, reduce hydrogen gas flow during cruise, and further reduce hydrogen gas flow during descent and landing.

In accordance with one aspect of the method the one or more of the plurality of valves are selectively opened or closed to provide a desired hydrogen gas flow.

In still yet another aspect of the disclosure the one or more valves are selectively proportionally opened or closed.

In still another aspect of the disclosure the plurality of venturis are sized differently from one another, and the valves associated with the plurality of venturis are sequentially opened and closed from smaller to larger and vice versa.

According to a further aspect of the present invention there is provided a hydrogen fuel-cell-powered aircraft comprising:

at least one electric motor, and
a hydrogen fuel-cell stack configured to power said at least one electric motor, wherein said hydrogen fuel stack includes
a hydrogen gas inlet, a
hydrogen gas recycling outlet, and
a hydrogen gas recirculation system for a hydrogen fuel-cell comprising:
  a) first, second and third venturis, and
  b) one or more valves configured to control flow of hydrogen gas to the plurality of venturis, wherein the one or more valves are configured to selectively open and close to optimize flow of the hydrogen gas through the first, second and third venturis through the stages of take-off and climb, reduce hydrogen gas flow to two of said first, second and third venturis during cruise, and further reduce hydrogen gas flow to one of said first, second and third venturis during descent and landing,
  c) a water separator upstream of the hydrogen gas inlet.

Preferably the hydrogen gas recirculation system further includes a digital controller configured to control the selective opening of the one or more valves.

Preferably the hydrogen gas recirculation system further includes a mechanical linkage connecting throttle plates of the plurality of venturis to one another.

In one alternative the plurality of venturis are similarly sized.

In one alternative the plurality of venturis are sized differently from one another.

Preferably the plurality of differently sized venturis are configured to open in sequence from smaller to larger, and vice versa.

Preferably the valves comprise proportional valves.

Preferably the plurality of venturis are connected in parallel.

Preferably the water separator comprises a cyclonic water separator.

In our co-pending US application Ser. No. 16/950,735 filed Nov. 17, 2020, the contents of which are incorporated herein by reference, we disclose an integrated hydrogen-electric engine that reduces aircraft noise and heat signatures of conventional fossil fuel burning engines, improves component reliability, increases the useful life of the engine, limits environmental pollution, and decreases the probability of failure per hour of operation. In particular, we disclose an integrated turboshaft engine with a multi-stage compressor similar to current turboshaft engines in the front, but with the remaining components replaced with a fuel-cell system that utilizes compressed air and compressed hydrogen to produce electricity that powers electric motors on an elongated shaft to deliver useful mechanical power to a propulsor (e.g., a fan or propeller). Part of the generated power can be utilized to drive the multi-stage compressor. This architecture delivers very high-power density and is able to deliver similar power density to modern jet engines (e.g., 6-8 kW/kg) at a pre-compression ratio of 30+(common in today's turbofan engines).

While the integrated hydrogen-electric engine described in our aforesaid U.S. application Ser. No. 16/950,735 provides a technically and commercially viable solution to the aforesaid and other disadvantages of conventional fossil fuel burning engines, driving the compressor by the same motor and shaft that drives the prime mover propulsor as described in our aforesaid U.S. application Ser. No. 16/950,735 is less than ideal since optimal compressor rotations per minute (RPM) generally is much higher than propulsor RPM. Even if compressor RPM is increased through gearing, the compressor is stuck at one RPM which may not be optimal for the compressor given different fuel-cell demands at ambient pressures, e.g., sea level versus altitude, for example 10,000 feet above mean sea level (MSL).

In order to overcome the aforesaid and other problems of the prior art, we provide a system i.e., a method and apparatus, for selectively driving the compressor from the same motor and shaft that drives the prime mover propulsor, but through an engagement mechanism such as a clutch and gears.

In one aspect of the disclosure we provide an integrated hydrogen-electric engine comprising an air compressor system, a hydrogen fuel source, a fuel-cell, an elongated shaft connected to the propulsor and a motor assembly disposed in electrical communication with the fuel-cell, wherein the air compressor system is connected to the shaft through an engagement mechanism such as a clutch and gearbox. The engagement mechanism may be a magnetic clutch, an hydraulic or pneumatic clutch, or a mechanical or electromechanical clutch.

In another aspect of the disclosure, the hydrogen-electric engine comprises a multi-stage or multi-spool engine comprising a first turbo cell and at least a second turbo cell, wherein each turbo cell stage comprises an air compressor system configured to be selectively driven by the shaft through an engagement mechanism and gears. As before, the engagement mechanism may be a magnetic clutch, a hydraulic or pneumatic clutch or a mechanical or electromechanical clutch.

In yet another aspect of the disclosure, the compressor or compressors are driven in response to air consumption needs of the fuel-cell by engaging or disengaging the engagement mechanism or clutch under the following conditions:
  Low Power, High Ambient P (e.g. Sea level)→clutch free
  High Power, High Ambient P (e.g. >10,000 ft MSL) →clutch engaged, low gear speed
  Low Power, Low Ambient P→clutch engaged, low gear speed
  High Power, Low Ambient P→clutch engaged, high hear speed In still yet another embodiment of the disclosure, the compressor may be driven by a controller in response to aircraft and/or fuel-cell states comprising one or more of:
  Throttle position
  Oxygen depletion
  Hydrogen depletion
  Hydrogen demand
  Phase of flight In another embodiment of the disclosure, the hydraulic-electric engine comprises a multi-spool compressor system including a low pressure compressor having a first inlet and an outlet, and a high pressure compressor downstream of the low pressure compressor, having an inlet in fluid communication with the outlet of the low pressure compressor and an outlet connected to the fuel-cell, wherein the low pressure compressor and the high pressure compressor are each connected to the shaft through engagement mechanisms. Alternatively, the hydraulic-electric engine may comprise a two-stage turbocell with first and second coaxial shafts connected via an engagement mechanism to first and second stage compressors. In such embodiment the first and second coaxial shafts are configured to run independently of one another, i.e., at different speeds. This permits us to provide essentially constant pressure to a fuel-cell while varying flow rate or outside ambient air pressure independently operating the compressors as follows:
  Low altitude: inner compressor
  High altitude: pre-compressor; which at low altitude/ ground operations may include:
    A bypass gate
    Blades designed to produce little air resistance
    Variable guide vanes to reduce air resistance.

In still yet another aspect of the disclosure, two or more compressors are provided which may be engaged or disengaged to provide oxygen flow depending on hydrogen flow needs.

In still yet another embodiment, the compressor is driven selectively by the shaft or by a battery-powered auxiliary electric motor, with an engagement mechanism configured to switch between the shaft and the electric motor. This allows us to start the compressor without spinning the propeller, or to power the compressor from the main motor and/or wind milling the propeller.

The compressors may comprise axial or centrifugal compressors.

The present disclosure also provides a method for driving an air-compressor system of an integrated hydrogen-electric engine comprising: a compressor system; a hydrogen fuel course; a fuel-cell; an elongated shaft configured to drive the air compressor system and a propulsor; and a motor assembly disposed in electrical communication with the fuel-cell, comprising selectively mechanically, connecting the air compressor system to the elongated shaft through an engagement mechanism.

In one embodiment of the method of engagement comprises a magnetic clutch, a hydraulic or pneumatic clutch, or a mechanical or electromechanical clutch, and including the step of engaging or disengaging the clutch.

In another aspect of the method, the clutch is engaged or disengaged under the following conditions:
  Low Power, High Ambient Pressure→clutch free
  High Power, High Ambient Pressure→clutch engaged, low gear speed
  Low Power, Low Ambient Pressure→clutch engaged, low gear speed
  High Power, Low Ambient Pressure clutch engaged→high hear speed In still yet another aspect of the method, the clutch is engaged or disengaged in response to aircraft or fuel-cell states comprising one or more of:
  Throttle position
  Oxygen depletion
  Hydrogen depletion
  Hydrogen demand
  Phase of flight.

In yet another aspect of the method the integrated hydrogen-electric engine further comprises an auxiliary electrically driven motor configured to power the air compressor system, and including the step of selectively engaging/disengaging the auxiliary electrically driven motor or the elongated shaft.

In yet another aspect of the method the clutch is configured to act as a brake to prevent rotation of one or more of the motor shaft, propeller shaft, and compressor for ground operation without spinning the propulsor, or a propulsor brake to reduce aerodynamic drag when desired, or to reduce drag in case of a motor or propulsor failure.

In a further aspect of the method the auxiliary electrically driven motor is battery-powered.

According to one aspect of the present invention there is provided an integrated hydrogen-electric engine comprising:
  an air compressor system;
  a hydrogen fuel source;
  a fuel-cell;
  an elongated shaft configured to drive the air compressor system and/or a propulsor; and
  a motor assembly disposed in electrical communication with the fuel-cell, wherein the air compressor system is connected to the elongated shaft through an engagement mechanism.

Preferably the engagement mechanism includes a gearbox.

Preferably the engagement mechanism comprises a magnetic clutch, a hydraulic or pneumatic clutch or a mechanical or electromechanical clutch.

Preferably the integrated hydrogen electric engine further includes a controller configured to control operation of the engagement mechanism.

Preferably the controller is configured to control operation of the engagement mechanism to activate the air compressor in response to air consumption requirements of the fuel-cell.

Preferably the controller is configured to control operation of the engagement mechanism to engage the air compressor in response to air consumption needs of the fuel-cell under the following conditions:
Low Power, High Ambient Pressure→clutch free
High Power, High Ambient Pressure→clutch engaged, low gear speed
Low Power, Low Ambient Pressure→clutch engaged, low gear speed
High Power, Low Ambient Pressure→clutch engaged, high hear speed Preferably the controller is configured to control operation of the engagement mechanism to engage the air compressor in response to aircraft and/or fuel-cell states comprising one or more of:
Throttle position
Oxygen depletion
Hydrogen depletion
Hydrogen demand
Phase of flight.

Preferably the integrated hydrogen-electric engine further comprises a plurality of compressors configured to be driven by the shaft through a plurality of engagement mechanisms.

Preferably the air compressor system comprises a multi-spool compressor system including a low pressure compressor having a first inlet and an outlet, and a high pressure compressor downstream of the low pressure compressor, having an inlet in fluid communication with the outlet of the low pressure compressor and an outlet connected to the fuel-cell, wherein the low pressure compressor and the high pressure compressor are each connected to the shaft through engagement mechanisms.

Preferably the engagement mechanisms include gearboxes.

Preferably the integrated hydrogen-electric engine further comprises an auxiliary electrically driven motor configured to power the air compressor system, wherein the engagement mechanism is configured to switch between the elongated shaft and the auxiliary electrically driven motor.

Preferably the auxiliary electrically driven motor is battery-powered.

Preferably the integrated hydrogen-electric engine is configured to power an aircraft.

According to another aspect of the present invention there is provided a method for driving an air compressor system of an integrated hydrogen-electric engine according to aspect "A" of the present invention.

According to a further aspect of the present invention there is provided a method for driving an air compressor system of an integrated hydrogen-electric engine comprising:
an air compressor system;
a hydrogen fuel source;
a fuel-cell;
an elongated shaft configured to drive the air compressor system and propulsor; and
a motor assembly disposed in electrical communication with the fuel-cell comprising selectively connecting the air compressor system to the elongated shaft through an engagement mechanism.

Preferably the engagement mechanism comprises a gearbox and a magnetic clutch, a hydraulic or pneumatic clutch, or a mechanical or electromechanical clutch, and including the step of controlling the clutch and optionally adjusting the gearbox.

Preferably the clutch and/or gearbox are controlled under the following conditions:
Low Power, High Ambient Pressure→clutch free
High Power, High Ambient Pressure→clutch engaged, low gear speed
Low Power, Low Ambient Pressure→clutch engaged, low gear speed
High Power, Low Ambient Pressure→clutch engaged, high hear speed Preferably the clutch and/or gearbox are controlled in response to aircraft or fuel-cell states comprising one or more of:
Throttle position
Oxygen depletion
Hydrogen depletion
Hydrogen demand
Phase of flight.

Preferably the integrated hydrogen-electric engine further comprises an auxiliary electrically driven motor configured to power the air compressor system, and including the step of selectively engaging/disengaging the auxiliary electrically driven motor or the elongated shaft.

Preferably the clutch is configured to act as a brake to prevent rotation of one or more of the motor shaft, propeller shaft, and compressor for ground operation without spinning the propulsor, or a propulsor brake to reduce aerodynamic drag when desired, or to reduce drag in case of a motor or propulsor failure.

Preferably the auxiliary electrically driven motor is battery-powered.

According to yet another aspect of the present invention there is provided a fuel-cell-powered airplane comprising at last one electric motor, and an integrated hydrogen-electric engine as previously described.

In accordance with another aspect of the present disclosure, we provide a hydrogen gas production system having a buffer battery system essentially sized to store the maximum power from renewable energy sources, and configured to store the daily average production of energy from the renewable energy source, connected over a direct DC link to an electrolyzer system sized to a 24 hour average renewable energy source output.

In one embodiment, the electrolyzer and/or the battery may be powered by power from the grid when electricity prices are low, i.e., during off peak hours.

In another aspect we provide a system for production of green hydrogen comprising: a renewable energy source configured for creating electrical energy; an electrolysis system configured for production of hydrogen, and a battery, wherein the battery is sized essentially to store the maximum power from the renewable energy source over 24 hours, while the electrolysis system is sized to consume the maximum daily power average production over 24 hours.

In one aspect the battery may comprise an electrical energy battery, such as a lithium ion battery, a lead acid battery, a flow cell battery or a molten salt battery.

In another aspect the battery may comprise a mechanical system configured to convert electrical energy to storage, such as a gravitational energy storage system, a hydraulic energy storage system or fly wheel energy storage system.

In yet another aspect the battery may comprise a thermal energy storage system.

In another aspect the system includes a power controller configured for routing power directly from the renewable power generator to the electrolyzer and/or to the battery.

In yet another aspect the system includes a power controller configured to route power to the electrolysis system at the electrolysis system's maximum power consumption design rate.

In yet another aspect the system is configured to be connected to the grid to permit intake of electrical energy from the grid during off peak hours.

In yet another aspect the electrolysis system is enclosed in a pressure vessel.

We also provide a method for production of green hydrogen comprising: providing a renewable energy source configured for creating electrical energy; providing an electrolysis system configured for production of hydrogen; and providing a battery, wherein the battery is sized essentially to store the maximum power from the renewable energy source over 24 hours, while the electrolysis system is sized to consume the maximum daily power average production over 24 hours, and operating the electrolysis system at its maximum power consumption design rate.

In one aspect of the method the battery comprises an electrical energy battery, and including the step of storing electrical energy from the renewable energy source as electrical energy, such as a lithium ion battery, a lead acid battery, a flow cell battery or a molten salt battery.

In another aspect of the method, the battery comprises a mechanical system configured to convert electrical energy to stored, mechanical energy, and including the step of converting the electrical energy from the renewable energy source into stored mechanical energy, such as a gravitational energy storage system, a hydraulic energy storage system or fly wheel energy storage system.

In still another aspect of the method the battery comprises a thermal energy storage system, and including the step of converting the energy from the renewable energy source to stored thermal energy.

In another aspect of the method we route power directly from the renewable power generator to the electrolyzer and/or to the battery.

In still yet another aspect of the method we tap and store electrical energy from the grid in the battery during off peak hours.

In yet another aspect of the method the hydrogen is compressed by compressor pumps when energy rates are low, or when excess renewable energy is available.

In a further aspect of the method the hydrogen is stored in a variable-volume container.

In yet another aspect of the method the electrolyzer and one or more storage tanks are enclosed in a pressure vessel, and including the step of using pressurized oxygen produced in the pressure vessel to power compressor pumps to compress the hydrogen.

In a further aspect of the method the hydrogen is compressed through a series of two or more pistons of different sizes.

According to one aspect of the present invention there is provided a system for production of green hydrogen comprising:
  a renewable energy source configured for creating electrical energy;
  an electrolysis system configured for production of hydrogen; and
  a battery,
  wherein the battery is sized essentially to store the anticipated maximum power from the renewable energy source over 24 hours, while the electrolysis system is sized to consume the anticipated maximum daily power average production over 24 hours, and
  the electrolysis system is enclosed in a pressure vessel.

Preferably the battery comprises an electrical energy battery.

Preferably the battery is selected from a lithium ion battery, a lead acid battery, a flow cell battery and a molten salt battery.

Preferably the battery comprises a mechanical system configured to convert electrical energy to storage.

Preferably the mechanical system is selected from a gravitational energy storage system, a hydraulic energy storage system and a fly wheel energy storage system.

Preferably the battery comprises a thermal energy storage system.

Preferably the system further includes a power controller configured for routing power directly from the renewable power generator to the electrolyzer and/or to the battery.

Preferably the power controller is configured to route power to the electrolysis system at the electrolysis system's maximum power consumption design rate.

Preferably the system is further configured to be connected to the grid to permit intake of electrical energy from the grid during off peak hours.

According to another aspect of the present invention there is provided a method for production of green hydrogen comprising:
  providing a system for production of green hydrogen according to aspect "A" of the present invention; and
  operating the electrolysis system at its anticipated maximum power consumption design rate.

According to yet another aspect of the present invention there is provided a method for production of green hydrogen comprising:
  providing a renewable energy source configured for creating electrical energy;
  providing an electrolysis system configured for production of hydrogen; and
  providing a battery,
  wherein the battery is sized essentially to store the anticipated maximum power from the renewable energy source over 24 hours, while the electrolysis system is sized to consume the anticipated maximum daily power average production over 24 hours, and
  operating the electrolysis system at its anticipated maximum power consumption design rate,
  wherein the electrolyzer and one or more storage tanks are enclosed in a pressure vessel, and including the step of using pressurized oxygen produced in the pressure vessel to power compressor pumps to compress the hydrogen.

Preferably the battery comprises an electrical energy battery, and including the step of storing electrical energy from the renewable energy source as electrical energy.

Preferably the battery is selected from a lithium ion battery, a lead acid battery, a flow cell battery and a molten salt battery.

Preferably the battery comprises a mechanical system configured to convert electrical energy to stored, mechanical energy, and including the step of converting the electrical energy from the renewable energy source into stored mechanical energy.

Preferably the mechanical storage battery is selected from a gravitational energy storage system, a hydraulic energy storage system and a fly wheel energy storage system.

Preferably the battery comprises a thermal energy storage system, and including the step of converting the energy from the renewable energy source to stored thermal energy.

Preferably the method further comprises routing power directly from the renewable power generator to the electrolyzer and/or to the battery.

Preferably the method further comprises tapping and storing electrical energy from the grid in the battery during off peak hours.

Preferably the hydrogen is compressed by compressor pumps when energy rates are low, or when excess renewable energy is available.

Preferably the hydrogen is stored in a variable-volume container.

Preferably the hydrogen is compressed through a series of two or more pistons of different sizes.

Cooling systems for fuel-cell-powered vehicles oftentimes use an airflow generated during movement of the vehicle as a heat transfer medium. For example, an ambient airflow may be directed from outside the vehicle through an air intake of the vehicle and through one or more heat exchangers disposed within the vehicle. An airflow generated in this manner is oftentimes referred to as ram air and, when ram air is used as a cooling medium in a vehicle, the vehicle may experience increased drag, which may reduce the energy efficiency of the vehicle.

Newton's law of cooling states that the rate of heat transfer is proportional to the temperature difference between the environment and object. Low temperature difference implies low heat transfer rate with a given area and heat transfer coefficient. The result is that the thermal management system requires a high coolant flow rate and large radiator core face area for a given freestream dynamic pressure.

The power absorbed by the heat exchanger is related to the velocity of the air passing over the heat exchanger which requires a favorable pressure gradient in the direction of flow. For a ram air-cooled heat exchanger this pressure gradient comes about due to partial stagnation of the incoming freestream flow and is limited by the freestream dynamic pressure. One may conclude that to reduce heat exchanger face area a higher air velocity is required which will command a higher pressure differential across the heat exchanger. Since the pressure drop across the heat exchanger and associated ducting must be equal to the available pressure difference (e.g. freestream dynamic pressure) there is a physical lower limit to the size of the heat exchanger. In order to further reduce the heat exchanger size a means of mechanically driving airflow is required, for example a fan or the present invention.

In fuel-cell-powered aircraft, a major challenge of ram air cooling is when the aircraft is sitting/taxing on the ground and during the takeoff and climb, when the power output demanded of the fuel-cells, and the amount of waste heat generated by the fuel-cells is greatest. During take-off and climb, 100% power output is only needed for 60-120 seconds on takeoff and initial climb to 1.000 feet. After 1,000 feet, power may be reduced by 20% for the normal climb portion of the flight, and the fuel-cell powerplant typically operates at a higher efficiency, resulting in 30% lower heat output. Waste heat generated during operation of powered aircraft may be dissipated by positioning an air-cooled heat exchanger in an ambient airflow path through the aircraft. When the aircraft is sitting/taxiing on the ground, the propellor slipstream provides sufficient airflow for cooling. However, during takeoff roll (from zero velocity until take-off speed), and potentially also during initial climb-out, airflow across the heat exchange surface is very low, which makes the capacity of the heat rejection system much lower during that stage of flight. Moreover, directing ambient air to flow through the aircraft (instead of around the aircraft) when the aircraft is moving creates drag, with the amount of drag experienced by the aircraft varying with the volume of ambient air directed through the aircraft (and thus through the heat exchanger) and the pressure drop across the heat exchanger. Traditionally an air-cooled heat exchanger system is integrated into a vehicle where the slipstream is available. However, for aircraft converted with hydrogen fuel-cell-powered propulsion systems, due to limitations of structure or weight and balance, the optimal location for installing the air-cooled heat exchanger system might not be available. Insufficient cooling during the ground operation may cause significant operational difficulty and potentially cause damage to the hydrogen fuel-cell-powered propulsion system.

During the takeoff phase, the airspeed is low but the hydrogen fuel-cell-powered propulsion systems generate maximum power and thus maximum thermal energy to be dissipated. Low airspeed implies low cooling capability. This is the phase where the thermal management system is under the maximum operating stress. Usually the radiator face area is sized in accordance with this operating condition.

In practice, the volume of the air-cooled heat exchanger (and the volume of air directed through the heat exchanger) may be selected to accommodate the most demanding cooling requirements of the aircraft, which may occur when the aircraft is operating under high load conditions, e.g., during take-off and climb. However, sizing the heat exchanger in this way may cause the aircraft to experience an unnecessarily large amount of drag when the aircraft is operating under low load conditions, e.g., during cruise, when minimal waste heat dissipation is needed. In addition, when cooling requirements are low, the presence of an oversized heat exchanger onboard the aircraft adds unnecessary weight and bulk to the aircraft.

In accordance with yet another aspect of the present disclosure, we inject the fuel-cell cathode exhaust in the outlet section of the cooling duct through a flow control nozzle to entrain further airflow in the outlet section which increases the pressure gradient across the upstream heat exchanger thereby increasing air mass flow through the heat exchanger. In practice, the fuel-cell chamber may be supplied with high pressure air from a compressor that is driven by a gearbox linked to a motor. The compressed air pushes through the fuel-cell stacks and exits through the exhaust at the cathode side mixing with water vapor and air. The residue of the compressed air still contains some kinetic energy and pressure. Furthermore, heating of the air through the fuel-cell stack will increase its temperature and cause it to expand increasing the volumetric flow available. In accordance with the present disclosure, we inject the cathode exhaust through a flow control nozzle into the outlet section of the heat exchanger ducting, creating a high speed air jet which entrains the surrounding air in the heat exchanger ducting. That is to say, the entrainment of air may be caused predominantly by shear mixing between the jet and entrained flow. This phenomenon increases the available pressure gradient and mass flow rate through the heat exchanger ducting system. In alternate embodiments, cathode exhaust may be mixed with bleed air from the compressor before the ejector.

As long as the fuel-cell system is operating, the ejector is supplied with moving air, even when the aircraft is in stationary or low speed taxing. During takeoff and cruise, the additional pressure drop caused by the ejector increases air mass flow through the heat exchanger, thereby enhancing cooling capability of the heat exchanger. Thus, the face area of the heat exchanger can be reduced. Since additional airflow is introduced into the cooling system, the momentum drag can be reduced, or even eliminated. Also, the cooling system can be reduced in size and weight.

Also, in the case of prior art hydrogen fuel-cell-powered vehicles such as aircraft, cooling airflow control traditionally has been accomplished using cowling flaps or sliding panels to regulate outlet flow speed. This is the predominant way to effectively control the quantity of airflow into the cooling installation with minimum drag penalty. However, the mechanical devices required to affect such control introduce complexity and additional weight to the aircraft. As will be described below, using a cathode exhaust flow control nozzle in accordance with the present disclosure provides a simple, lightweight but effective alternative to regulate flow and improve cooling capability. The use of a cathode exhaust flow control nozzle also serves essentially to recycle the wasted energy out of the cathode exhaust. As a result, it improves the overall system's efficiency.

In one aspect of the disclosure there is provided an integrated hydrogen-electric engine comprising: a hydrogen fuel-cell; an air inlet coupled to a cooling duct having a radiator in the cooling duct, and configured to direct an air stream from the air inlet through the radiator, and/or wherein an exhaust stream from a cathode side of the fuel-cell is fed into the cooling duct.

In one aspect the integrated hydrogen-electric engine comprises a motor assembly is configured to drive a propulsor.

In another aspect, the exhaust stream is fed via a flow control nozzle into the air stream in the cooling duct downstream of the radiator.

In another aspect the exhaust stream is fed via a flow control nozzle into the air stream in the cooling duct upstream of the radiator.

In another aspect the duct includes a constructed section downstream of the flow control nozzle.

In still another aspect, the flow control nozzle is configured to inject the exhaust stream from the cathode side of the fuel-cell tangentially to the air stream in the duct.

In a further aspect the engine comprises a valve configured to regulate mass flow or pressure of the cathode exhaust stream at the flow control nozzle.

In yet another aspect a bypass outlet is provided upstream of the flow control nozzle configured to maintain back pressure on the fuel-cell.

In a further aspect the integrated hydrogen engine is on board a vehicle including, but not limited to an airplane.

In another aspect, the integrated hydrogen engine is on board an airplane, and the duct is integrated into wings, and/or a fuselage of the aircraft.

The disclosure also provides a method for cooling a fuel-cell aboard a vehicle, wherein the vehicle includes an integrated hydrogen-electric engine comprising: a hydrogen fuel-cell; an air inlet coupled to a cooling duct, and a cooling system having a radiator in the cooling duct, the step of directing an air stream from the air inlet through the radiator, and/or feeding an exhaust stream from a cathode side of the fuel-cell into the cooling duct.

In one aspect of the method the exhaust stream is fed via a flow control nozzle into the air stream in the cooling duct downstream of the radiator.

In another aspect of the method the exhaust stream is fed via a flow control nozzle into the air stream upstream of the radiator.

In another aspect of the method the cooling duct includes a constricted section configured for decreasing pressure drop in air mass flow rate downstream of the flow control nozzle.

In a further aspect of the method the flow control nozzle is configured to inject the exhaust stream from the cathode side of the fuel-cell tangentially to the airflow in the duct.

In yet another aspect of the method a valve is provided upstream of the flow control nozzle for regulating mass flow or pressure of the cathode exhaust stream at the flow control nozzle.

In a further aspect of the method a bypass outlet is provided upstream of the flow control nozzle configured to maintain back pressure on the fuel-cell.

In yet a further aspect of the method the vehicle comprises an airplane, and the duct is integrated into wings and/or a fuselage of the aircraft.

In yet another aspect of the method a portion of the cathode exhaust is mixed with bleed air from an air compressor system prior to being fed into the cooling duct.

Further areas of applicability will become apparent from the description provided herein. The description and specific examples in this summary are intended for purposes of illustration only and are not intended to limit the scope of the present disclosure.

Further features and advantages of the disclosure will be seen in the following detailed description, taken in conjunction with the accompanying drawings. The drawings described herein are for illustrative purposes only of selected embodiments and not all possible implementations and are not intended to limit the scope of the present disclosure.

In the drawings:

FIG. 1 is a cross sectional view depicting a conventional prior art fuel-cell:

FIG. 2 maps an aviation duty cycle from ground warming, taxi, take-off, climbing, cruising, descent and landing;

FIG. 3 maps power requirements to hydrogen fuel requirements relative to duty cycle:

FIG. 4 schematically illustrates a switchable hydrogen gas venturi array in accordance with a first embodiment of the present disclosure;

FIGS. 8A-8C illustrate activation of one, two and three venturis in accordance with the present disclosure;

Figure 23:
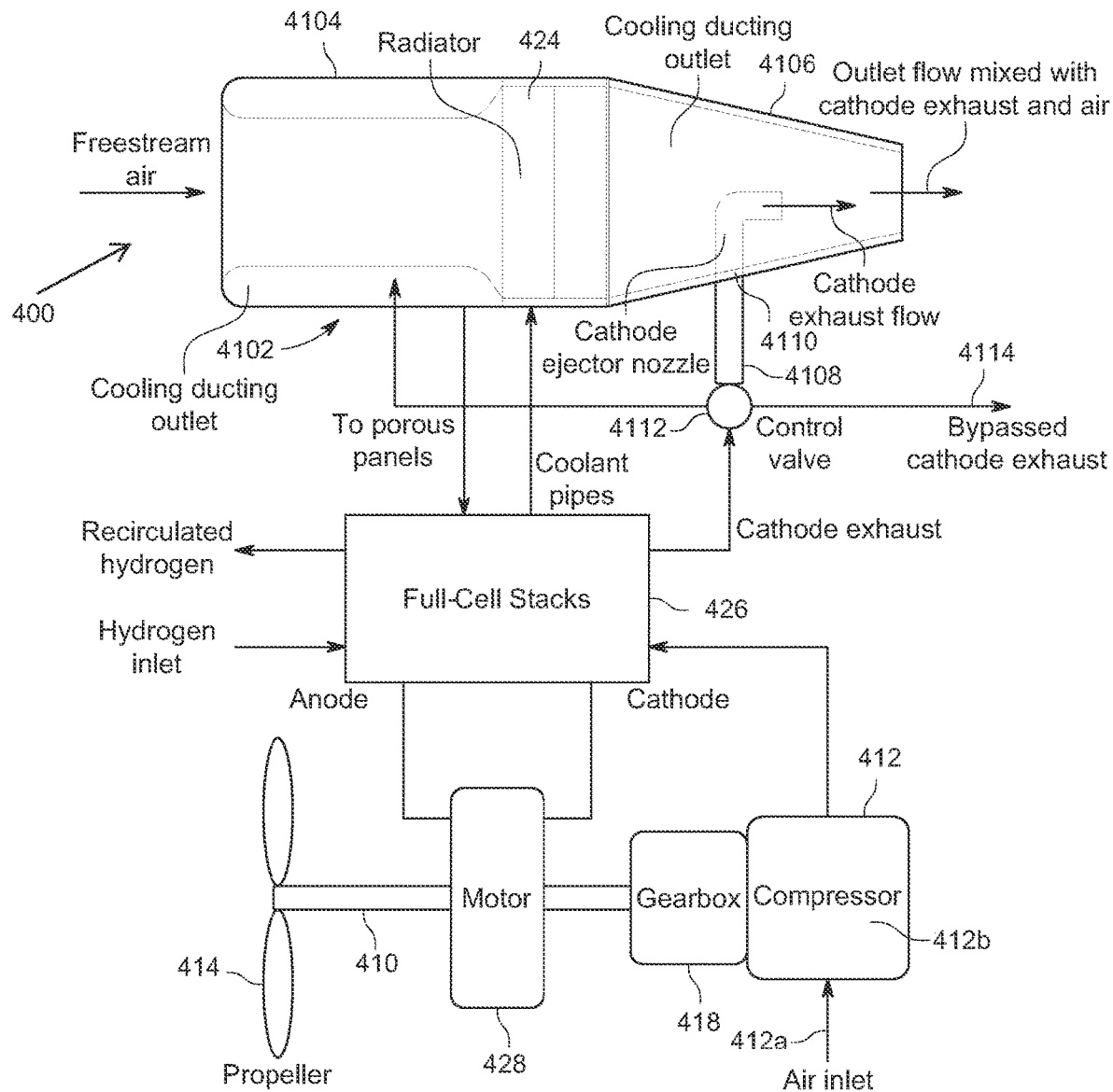
FIG. 23 is a schematic view of an integrated hydrogen-electric system in accordance with the present disclosure.
Figure 28A:
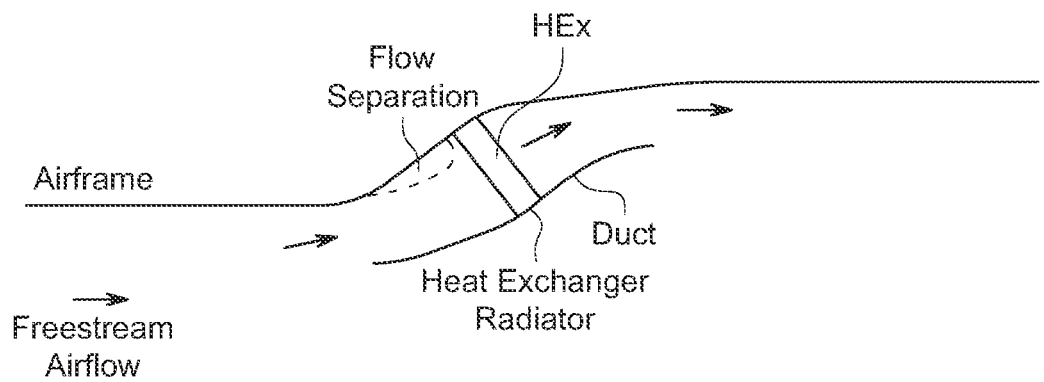
Figure 28B:
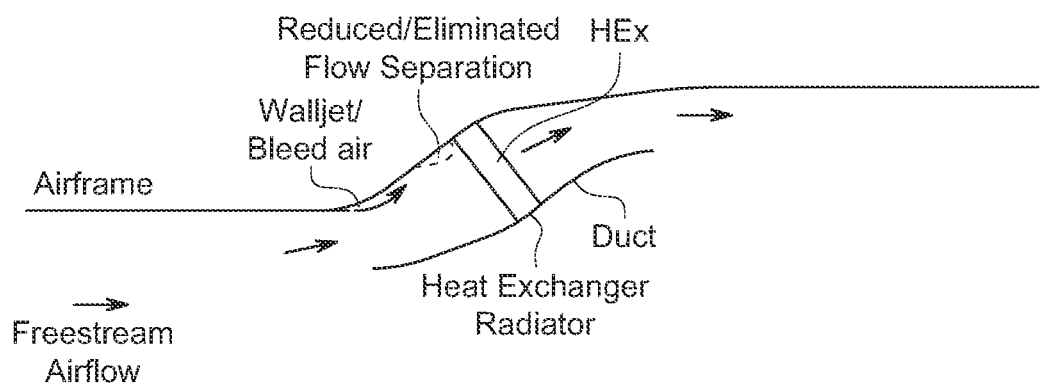
Figure 29:
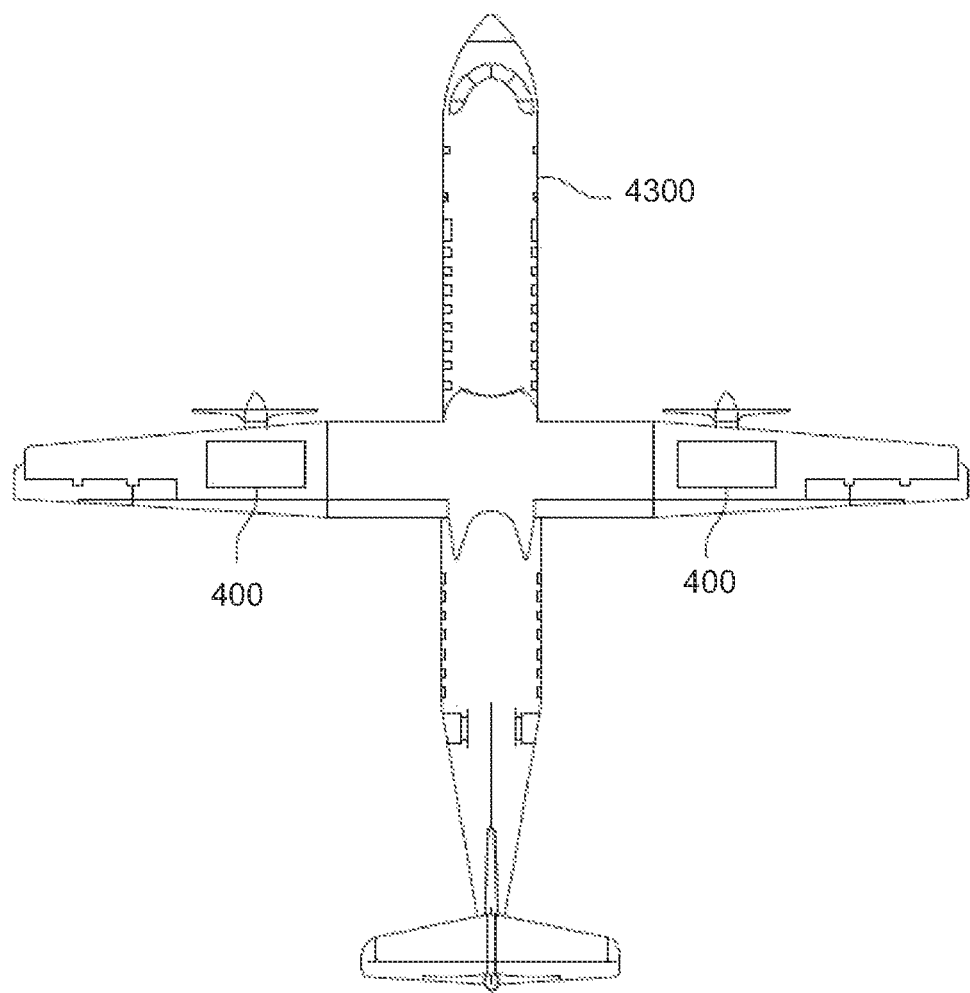

FIGS. 28A and 28B schematically illustrate duct flow patterns in accordance with other aspects of the present disclosure; and FIG. 29 schematically illustrates the present integrated hydrogen-electric engine system of FIG. 23 on an aircraft.

Example embodiments will now be described more fully with reference to the accompanying drawings. Example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers, and/or sections, these elements, components, regions, layers, and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Also, as used herein the term "radiator" and "heat exchanger" may be used interchangeably.

The present disclosure has particular utility for use with proton-exchange membrane hydrogen fuel-cells, or so-called hydrogen fuel-cells, for powering aircraft, and will be described in connection with such utility, although the disclosure is not limited to hydrogen fuel-cells for powering aircraft.

Although illustrative systems of this disclosure will be described in terms of specific aspects, various modifications, rearrangements, and substitutions may be made without departing from the spirit of this disclosure.

For purposes of promoting an understanding of the principles of this disclosure, reference will now be made to exemplary aspects illustrated in the figures, and specific language will be used to describe the same. It will nevertheless be understood that no limitation of the scope of this disclosure is thereby intended. Any alterations and further modifications of this disclosure features illustrated herein, and any additional applications of the principles of this disclosure as illustrated herein, are to be considered within the scope of this disclosure.

In the following description, well-known functions or constructions are not described in detail to avoid obscuring the present disclosure in unnecessary detail.

Figure 1:
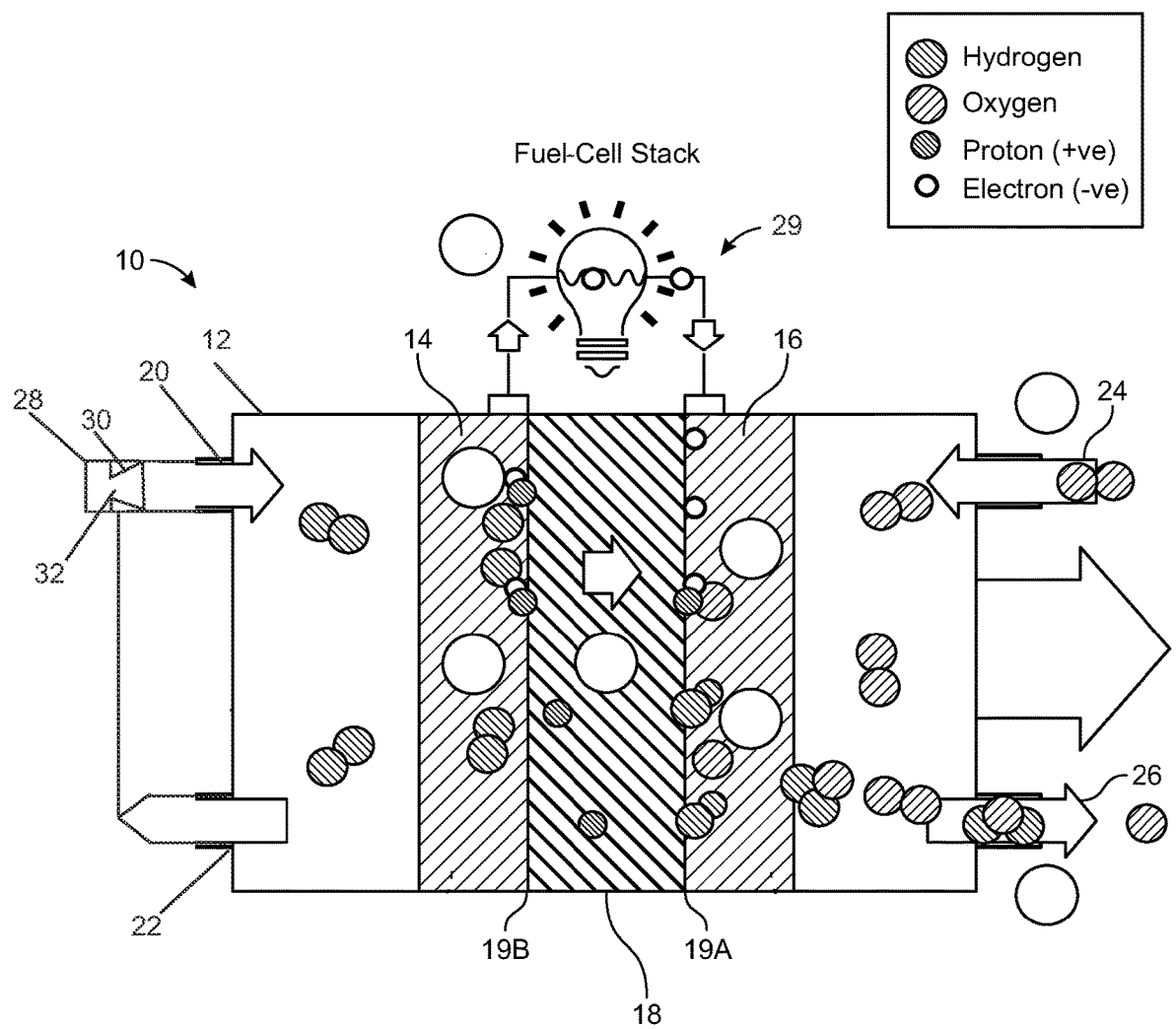
Figure 2:
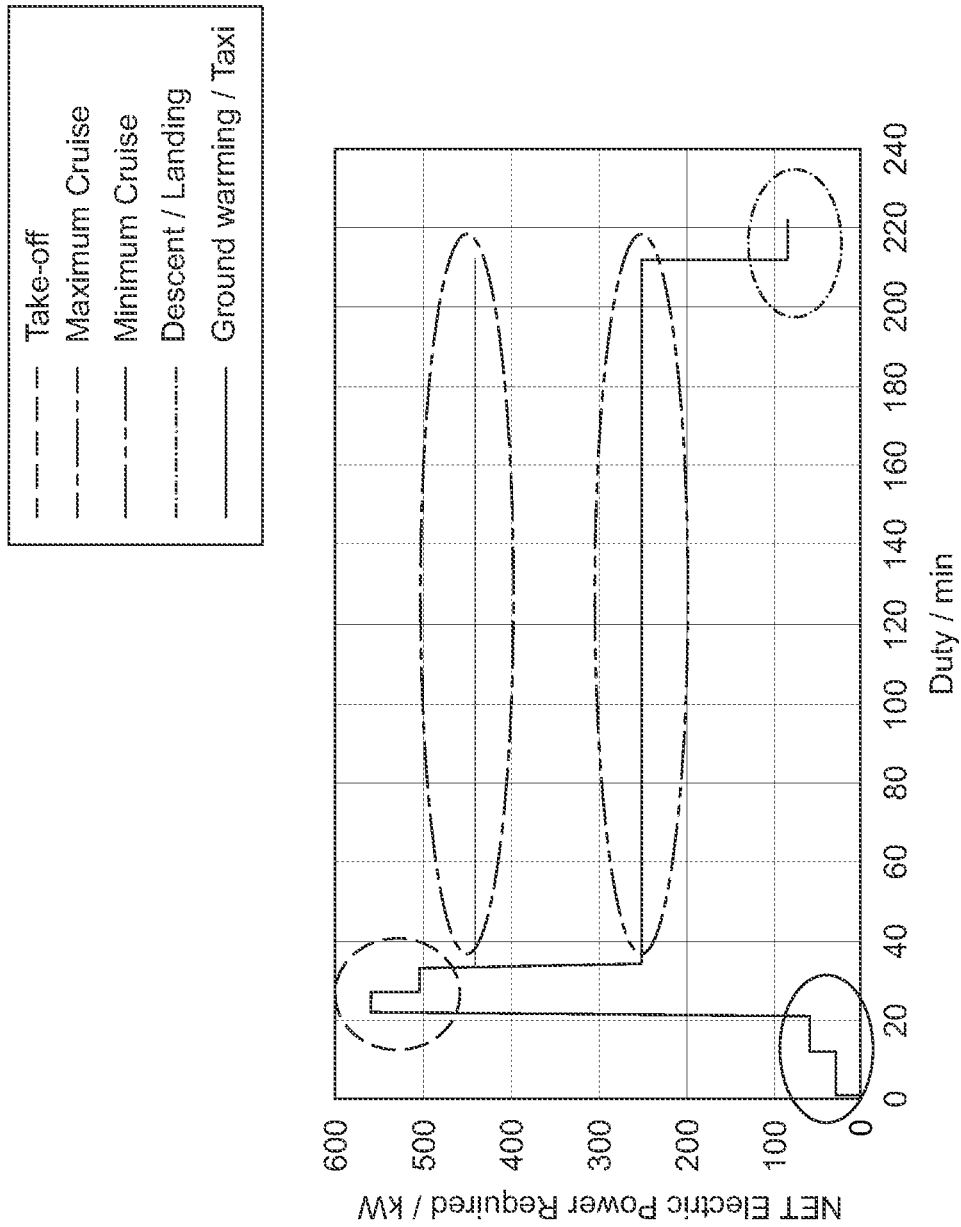

Given the relatively consistent nature of aviation duty cycles, it is possible to define flight power requirements. FIG. 2 maps flight power requirements from ground warming, taxi, take-off, climbing, cruise, descent and landing.

Figure 3:
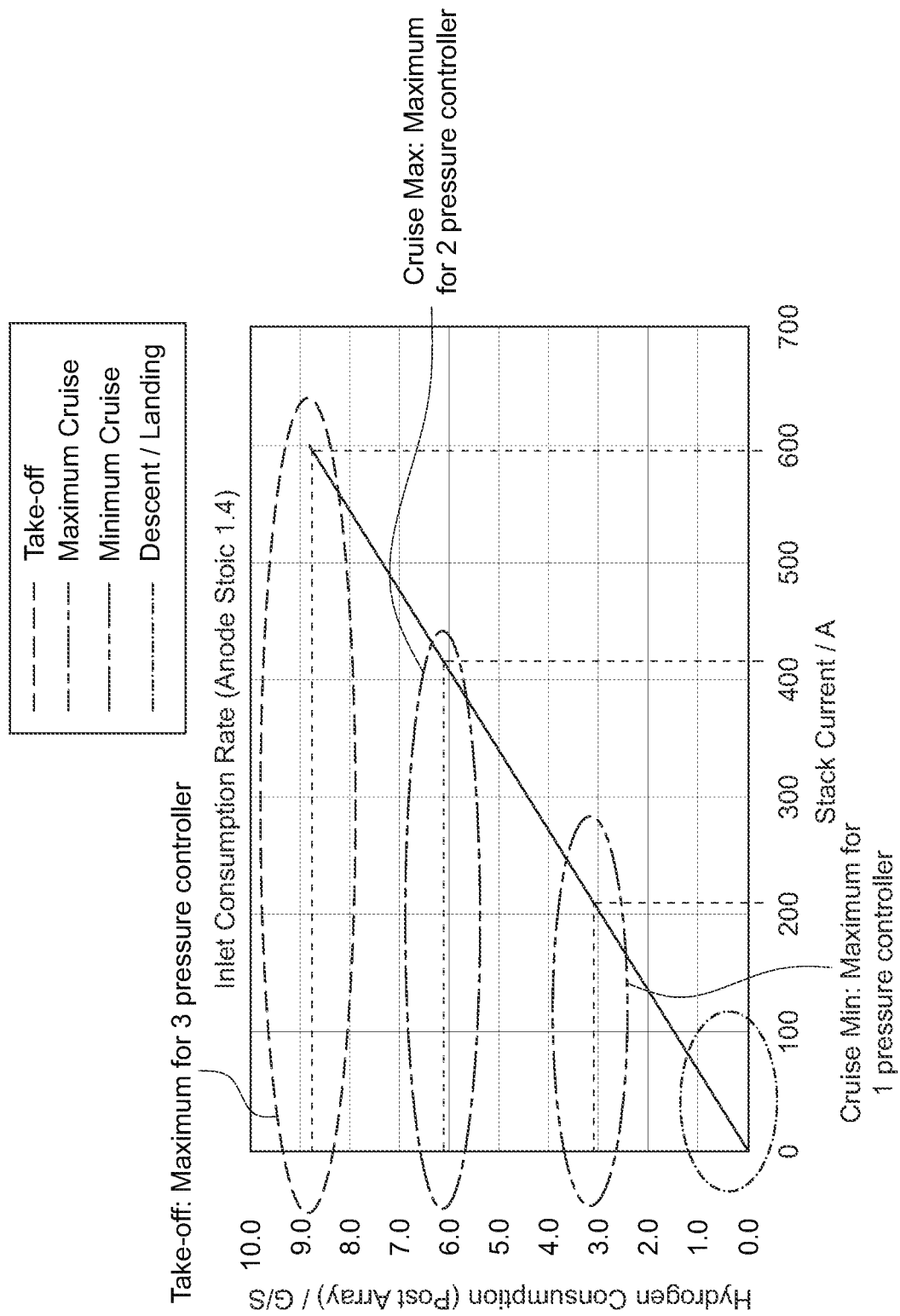

These power requirements can then be mapped to hydrogen fuel consumption requirements as shown in FIG. 3.

One of the requirements of hydrogen gas fuel management systems is to control the anode inlet pressure to be above that of the cathode inlet pressure. This is achieved by measuring the inlet pressure of the hydrogen into the fuel-cell stack and then electronically modifying the flow rate to achieve the required pressure. The purpose of this requirement is to ensure that the internal membrane electrode assembly and gaskets within the stack's cells are not disproportionately stressed having variable air pressure on one side and delivered hydrogen pressure on the other, with the bias always mandating the anode pressure to be above that of the cathode pressure (for cross-over air degradation requirements). The hardware responsible for controlling this flow/pressure also determines the available mass flow to be pushed through the venturi. Thus, in the case of terrestrial vehicles such as automobiles, a single venturi may be sufficient to provide the fuel flow rate required for all stages of operation. And, while a single venturi device might be sufficient to provide the fuel for a plane's constant cruise requirements, a single venturi device would not provide the flow rate required for a plane's take-off and climbing requirements.

Figure 4:
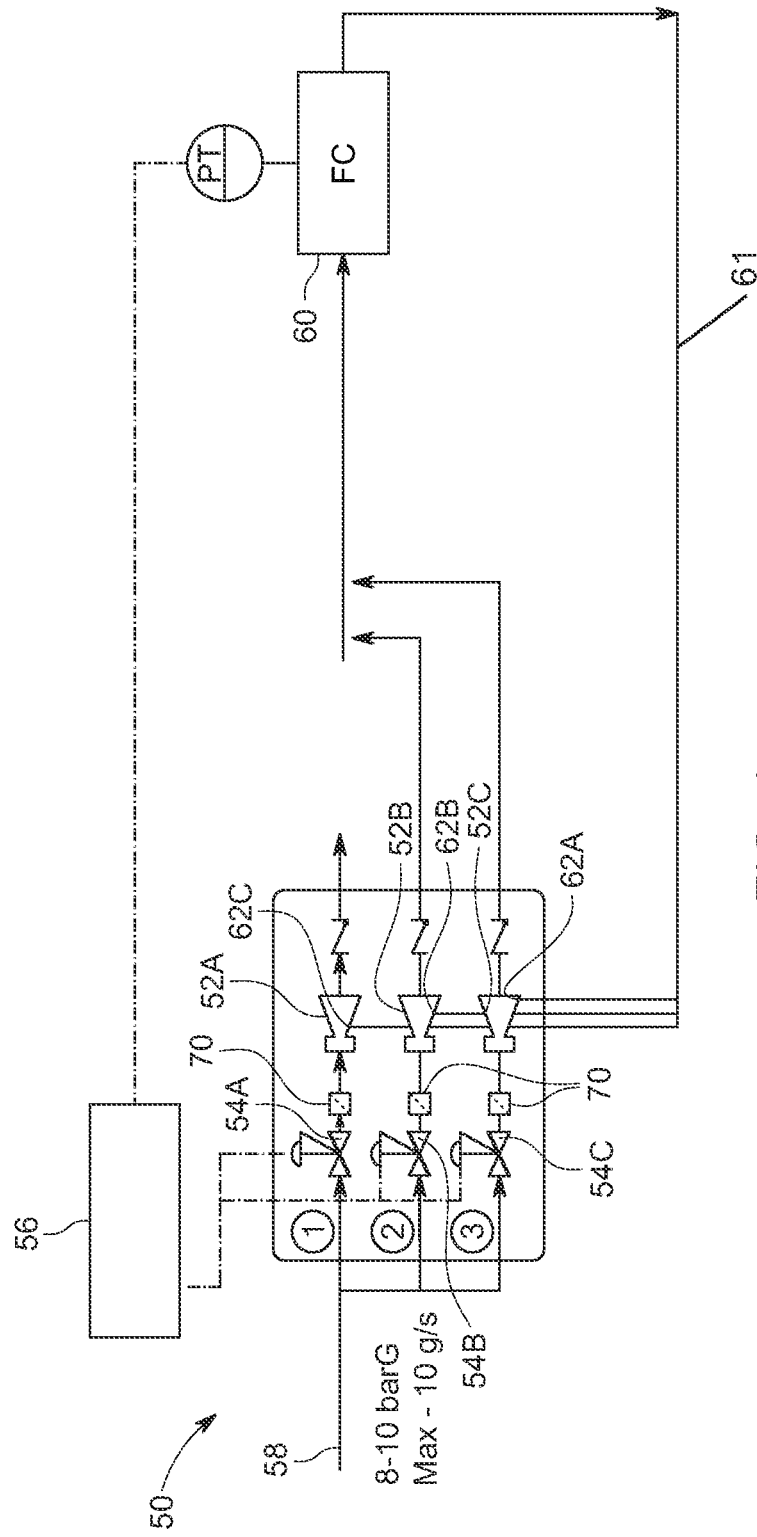

Combining all these considerations together: the availability of pre-validated fuel-cell system pressure controllers; the need to size the venturi for constant cruise power; the issue of turn-down suction when sized for take-off; the significant weight/volume savings of using a venturi; and the fact a venturi is a passive device, in accordance with the present disclosure, we provide a hydrogen fuel-cell system including an array of switchable venturis. Referring to FIG. 4, in a first embodiment, we provide an array 50 of three switchable venturis 52A, 52B, 52C, which collectively have a capacity for the consumption duty cycle anticipated within the aviation application from warm up and taxi, take-off and climbing, cruising, descent and landing. More particularly, venturis 52A, 52B and 52C each have an associated valve actuator 54A, 54B, 54C respectively which are controlled by a controller 56. Valves 54A, 54B, 54C all are connected to a common hydrogen gas supply 58. Venturis 52A, 52B, 52C are connected in parallel to a common hydrogen fuel-cell stack inlet 60. Venturis 52A, 52B, 52C each preferably also include hydrogen gas recirculation inlets 62A, 62B, 62C connected to a hydrogen fuel-cell stack recirculation line 61. Alternatively, it is sufficient to provide a hydrogen gas recirculation inlet to fewer than all three venturis 52A, 52B, 52C. As shown in FIG. 4, venturis 52A, 52B and 52C are all the same size. Mechanical linkages 70 may be provided connecting the throttle plates of the three venturis 52A, 52B, 52C, so that the three venturis open and close in sequence, under control of controller 56.

Figure 5:
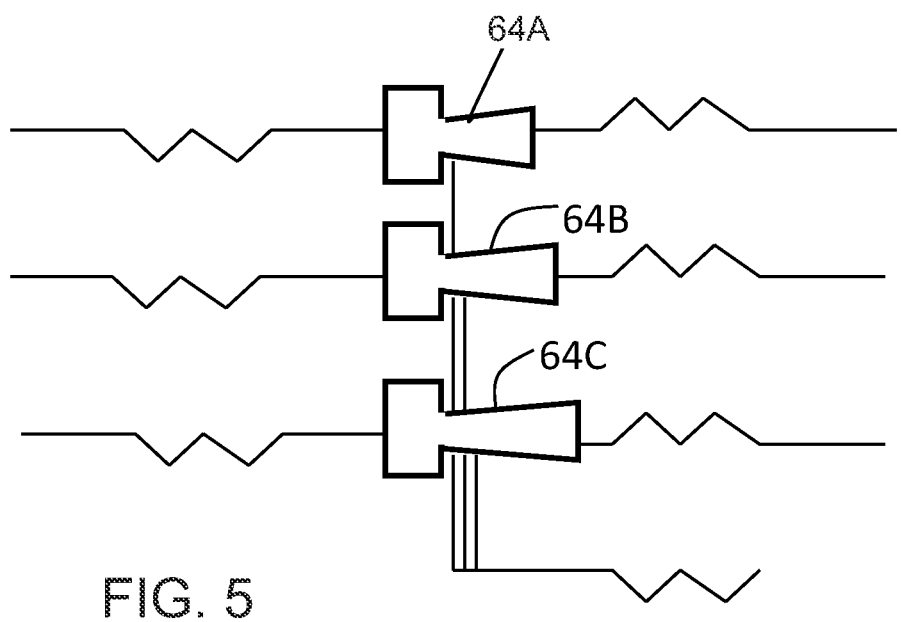
FIGS. 5 and 6 are views similar to FIG. 4 of alternative embodiments of switchable hydrogen gas venturi arrays in accordance with the present disclosure.

Alternatively, as shown in FIG. 5, the venturis 64A, 64B and 64C may be differently sized and may be configured to open and close from smaller to larger, or vice versa.

Figure 6:
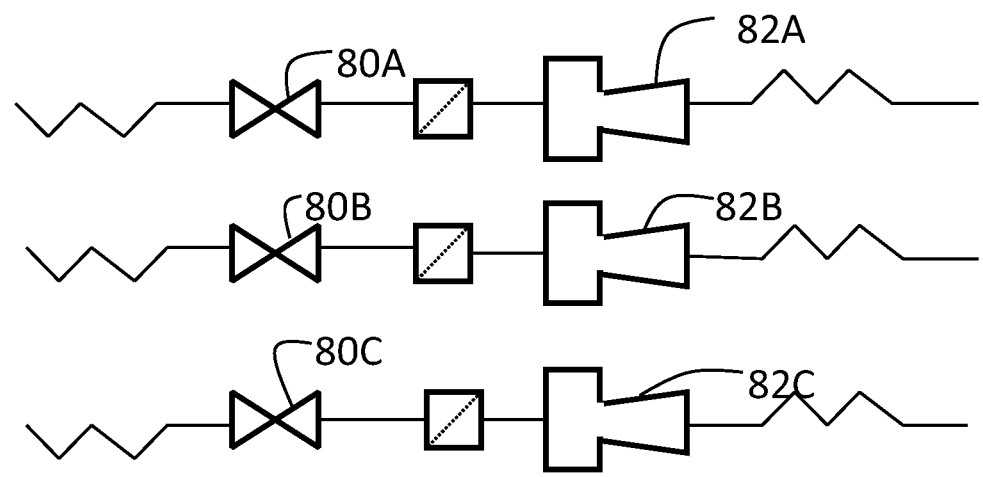

Referring to FIG. 6, in yet another embodiment the array may include proportional valves 80A, 80B, 80C which may be controlled to allow lower flow through the venturis 82A, 82B, 82C during start-up, taxiing and descent.

Figure 7:
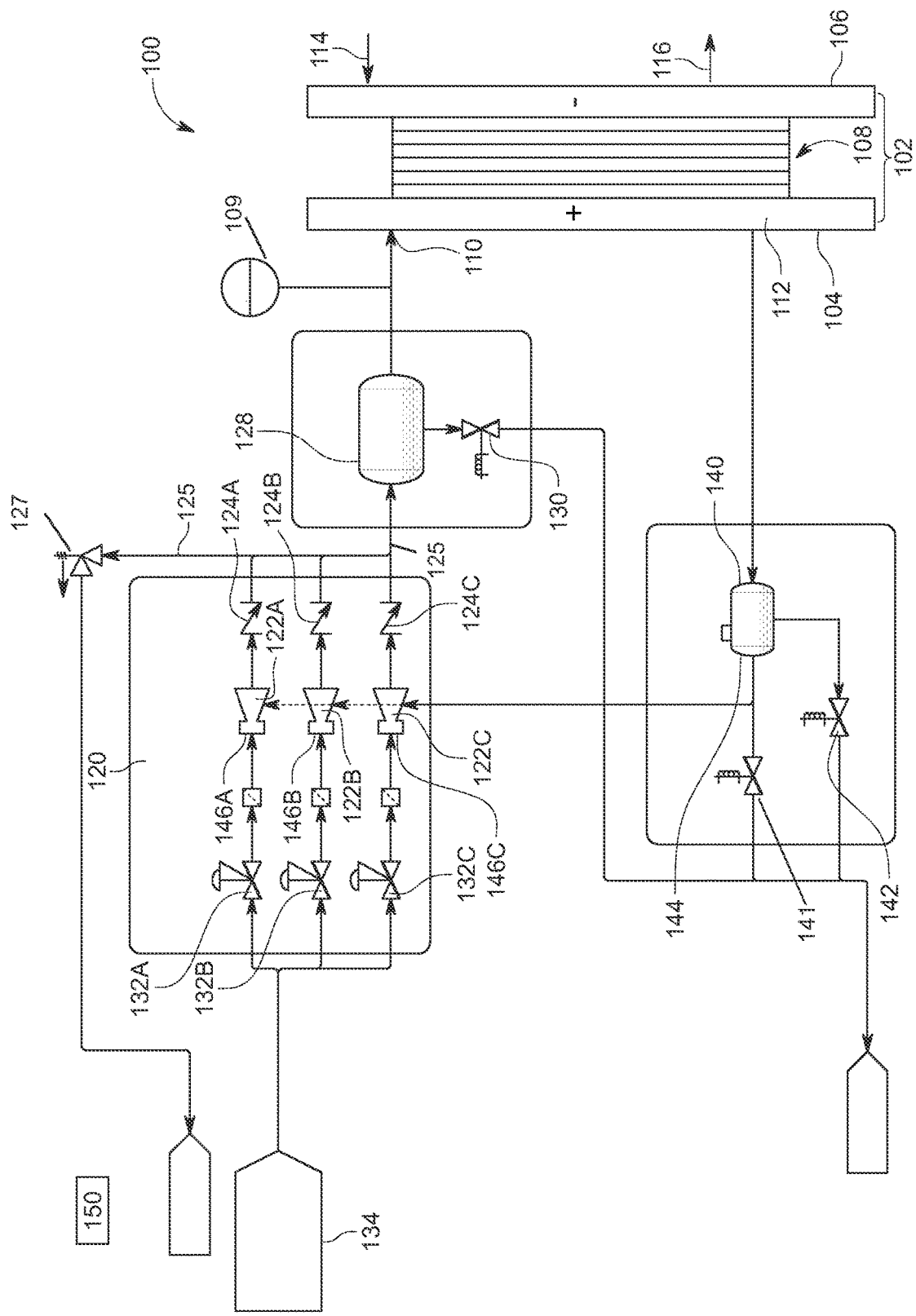
FIG. 7 is a schematic view of a hydrogen gas fuel-cell system in accordance with the present disclosure.

FIG. 7 illustrates in more detail a hydrogen gas fuel-cell system 100 in accordance with the present disclosure, including a fuel-cell 102 having an anode 104, a cathode 106 and proton exchange membrane 108. Cell 102 includes a hydrogen gas inlet pressure gauge 109, a hydrogen gas inlet 110 and a hydrogen gas recycling outlet 112 at the anode 104, and an oxygen gas inlet 114, and a water outlet 116 at the cathode 106. An array 120 of three venturis 122A, 122B, 122C are connected through one-way valves 124A, 124B, 124C and conduit 125 to a cyclonic water separator 128 which removes water vapor from the hydrogen gas before it is fed via inlet 110 to the fuel-cell 102. Cyclonic water separator 128 also includes a valved water drain 130. Conduit 125 also may include a purge valve 127.

Venturis 122A, 122B, 122C are connected via flow control valves 132A, 132B, 132C to hydrogen fuel tank 134.

Since the recycled hydrogen gas from anode outlet 112 also may contain some water vapor, the recycled hydrogen is first passed through a cyclonic water separator 140. Cyclonic water separator 140 includes a purge valve 141 and a valved water drain 142 and a recycle hydrogen gas outlet 144 which is connected to the recirculation inlets 146A, 146B, 146C of venturis 122A, 122B, 122C.

Operation of the entire hydrogen fuel-cell system 100 is under control of controller 150.

Figure 8B:
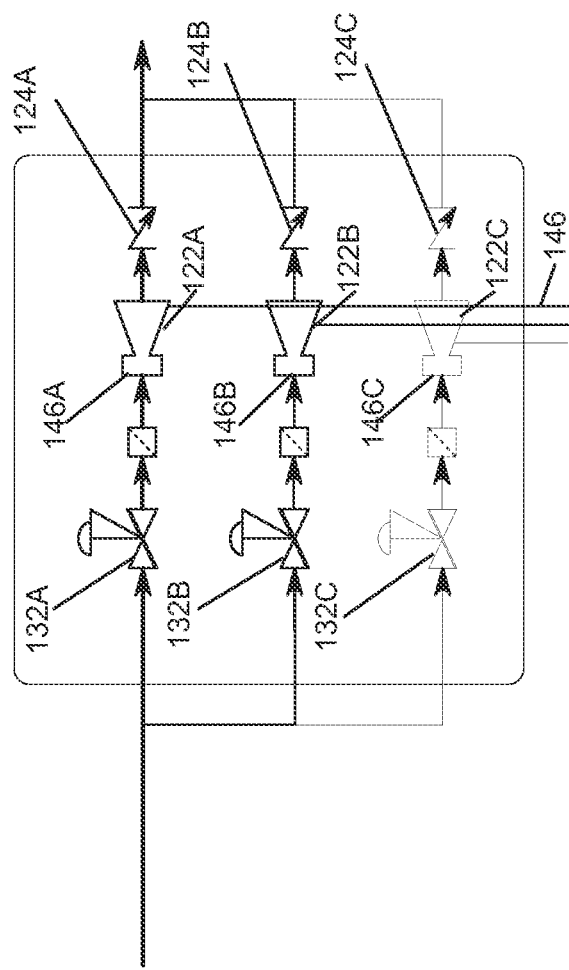
Figure 8C:
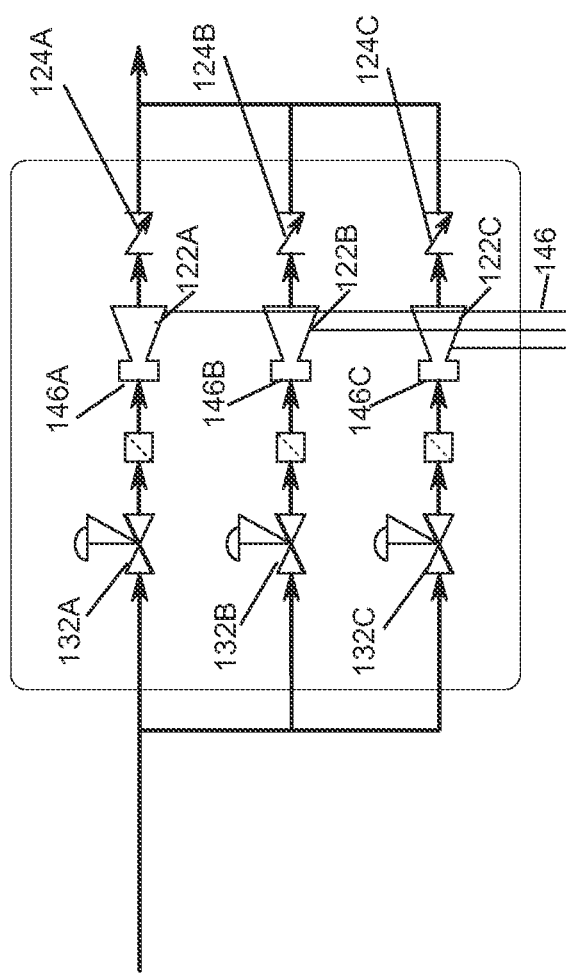
Figure 9A:
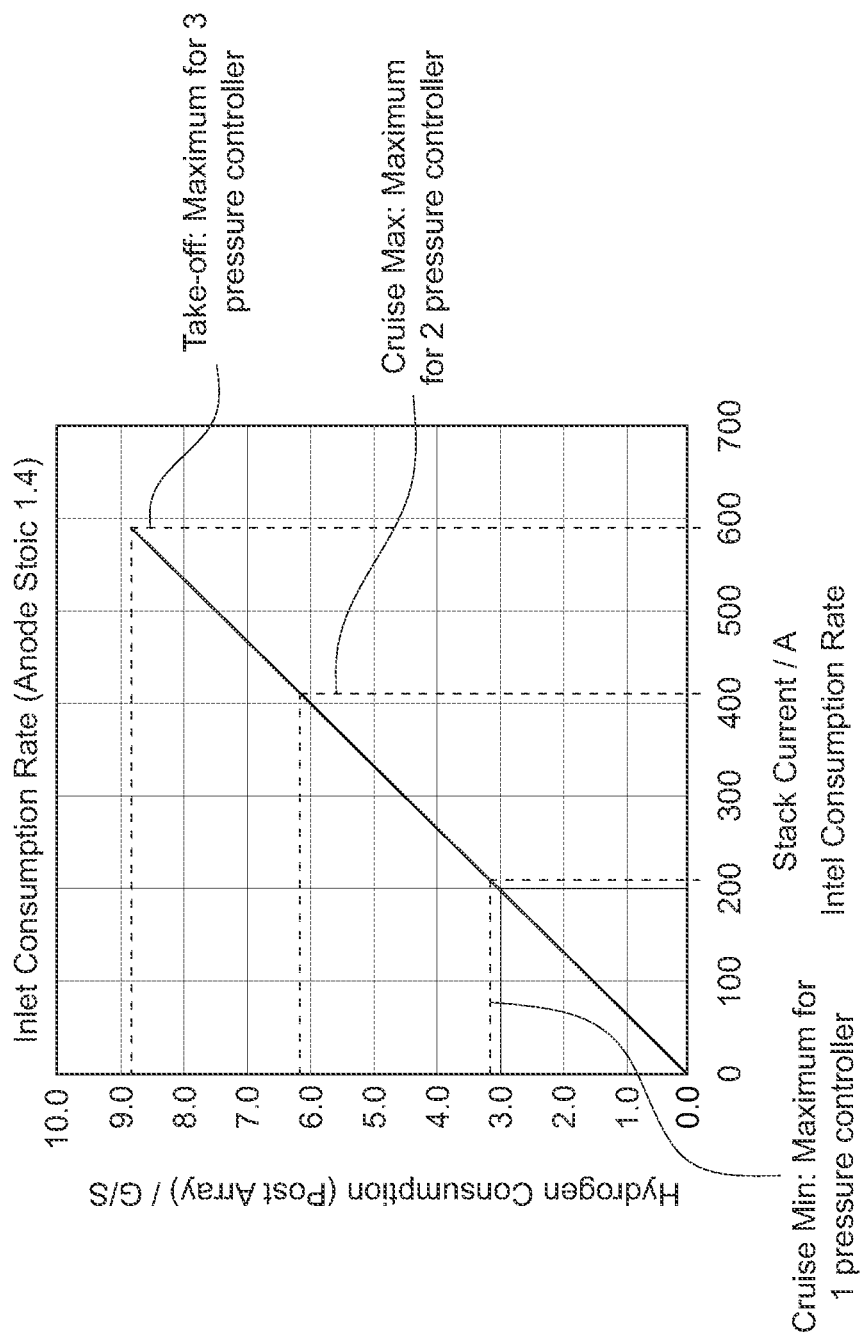
FIGS. 9A-9C are graphs of hydrogen gas flow corresponding to activation of one, two and three venturis as illustrated in FIGS. 8A-8C.
Figure 9B:
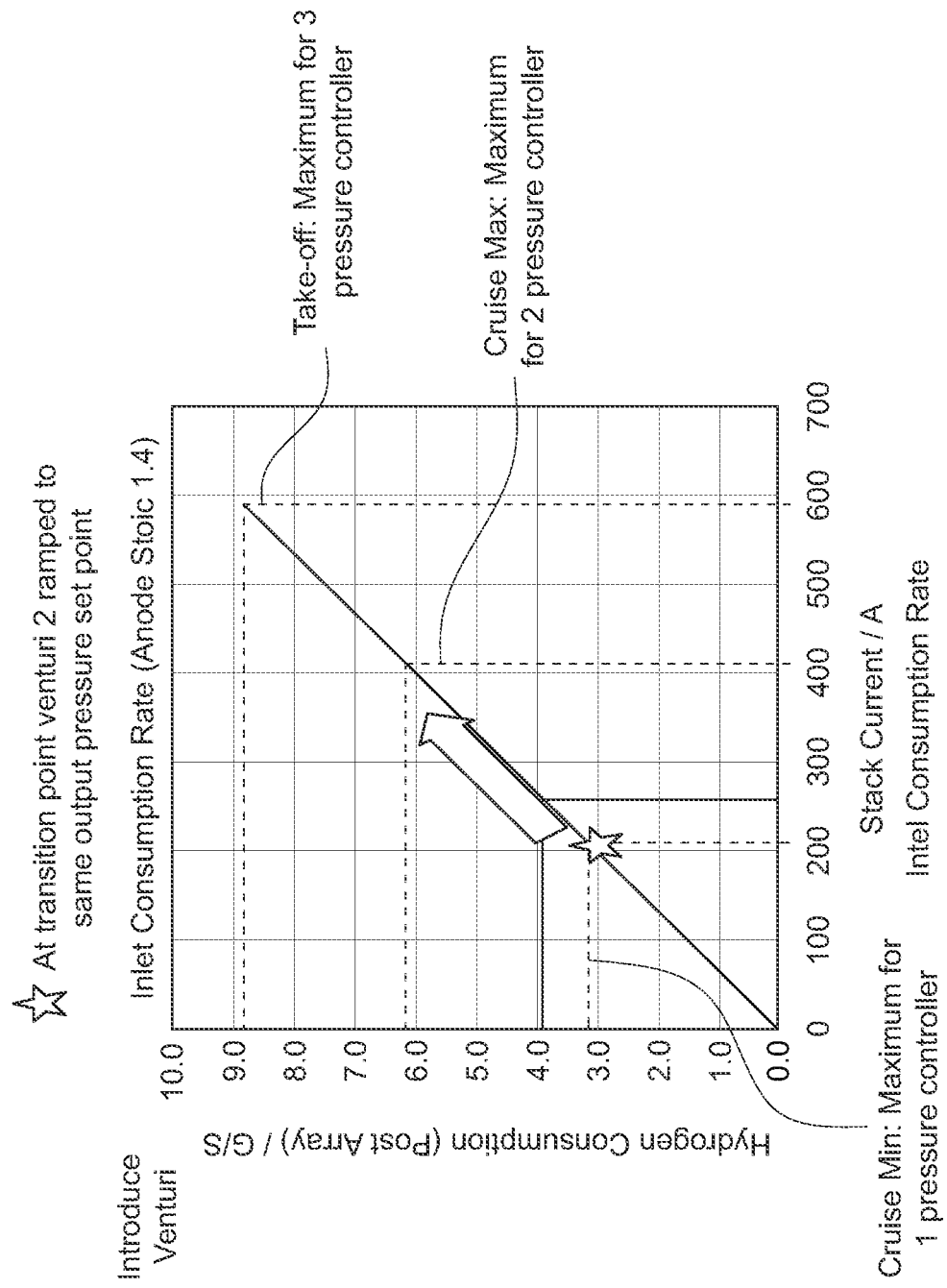
Figure 9C:
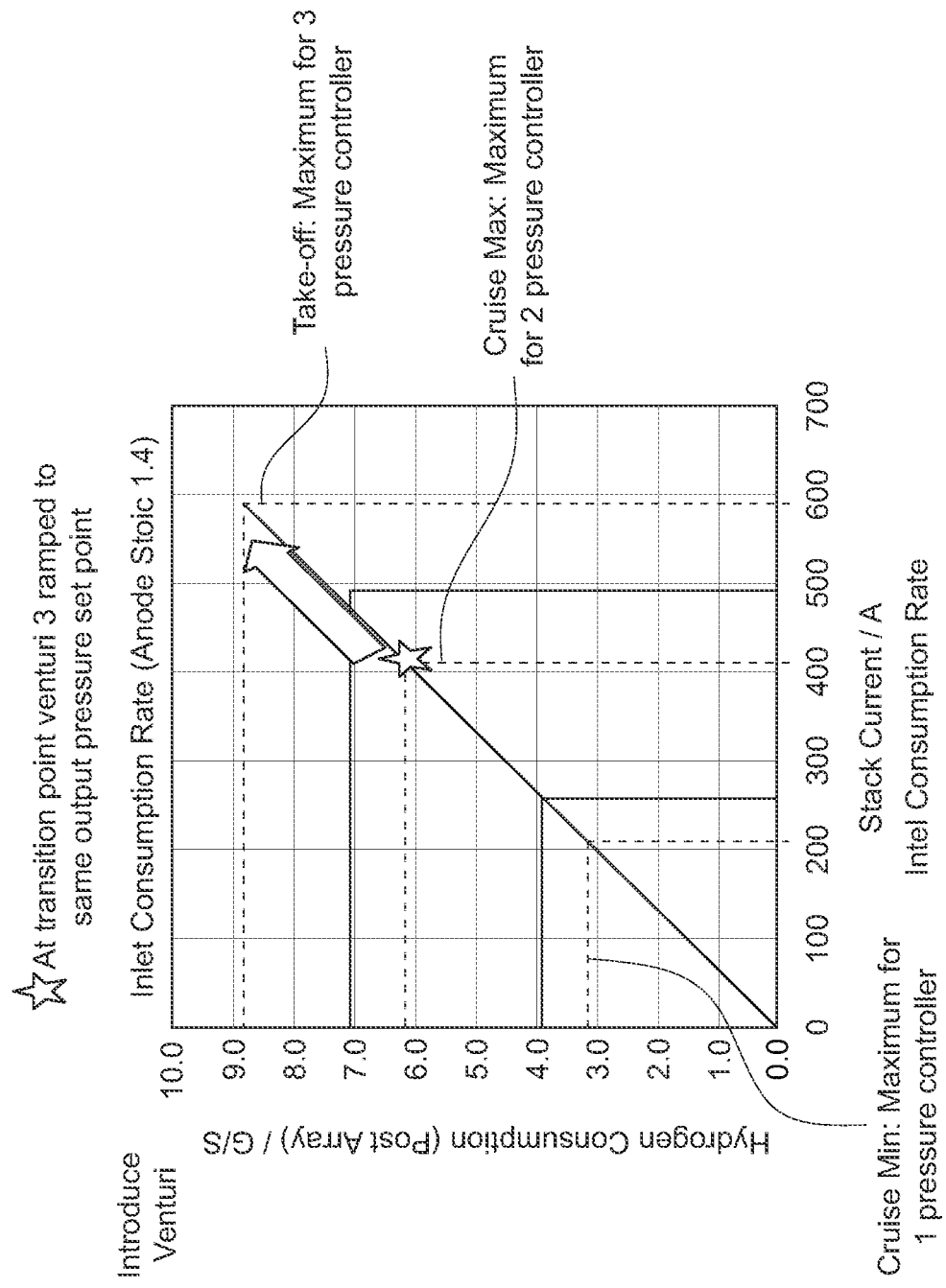
Figure 10:
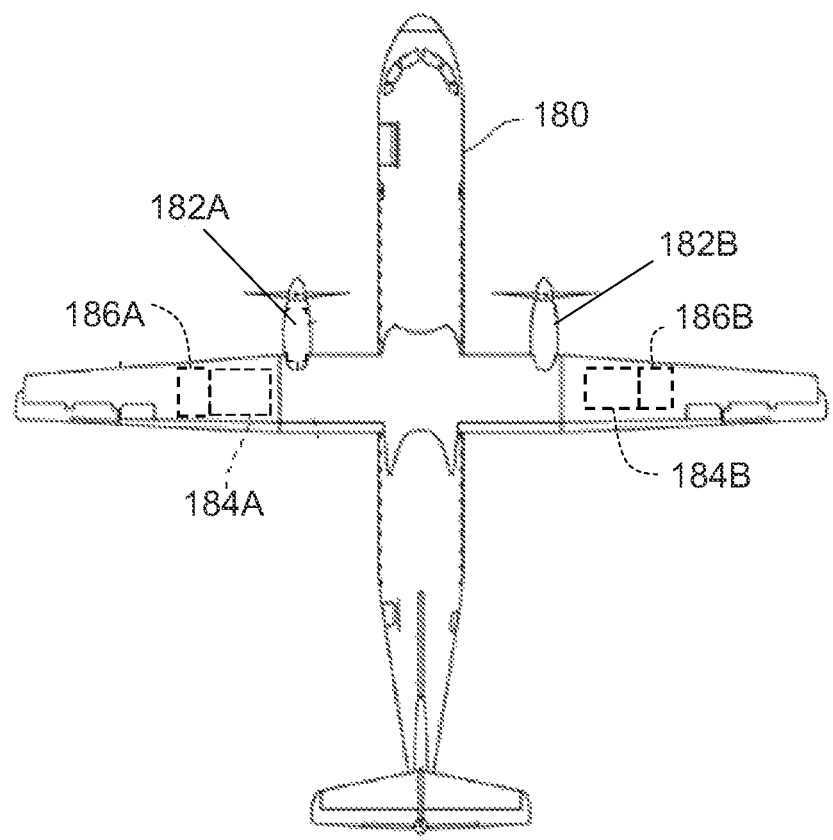
FIG. 10 is a schematic view of a hydrogen gas fuel-cell-powered airplane having a hydrogen gas recirculation system in accordance with the present disclosure.

FIGS. 8A-8C illustrate activation of the one, two and three venturis 122A, 122B, 122C. FIGS. 9A-9C are graphs of hydrogen gas flow corresponding to activation of one, two or three venturis on an airplane as illustrated in FIG. 10. Airplane 180 includes two electric motors 182A, 182B which are supplied by two parallel hydrogen fuel-cell systems 184A, 184B including an array of switchable venturis 186A, 186B in accordance with the present disclosure For take-off (600 A—9 grams/sec) three venturis will be enabled.

For maximum cruise (440 A—6 grams/sec) two venturis will be enabled, the third venturi will be disabled and have zero flow. In this case the two active venturis will receive 3 grams/sec each, 6 grams/sec total, and still provide the maximum passive recirculation suction possible, as they aren't turn-down limited.

For descent and landing, and also taxiing, a single venturi will be enabled, while the other two venturis are turned-down.

A feature and advantage of the present disclosure is given the relatively small size and weight of valve and venting components adding a third venturi also provides a redundancy stream, should either of the other venturi have issues. Another feature and advantage of the present disclosure is the active order of venturi feed streams may be cycled over life, spreading any potential component wear across the array of valves and venturis and improving mean time between failures. For example, the cruise stream will see the most active service, but over time the valves and venturis used to form the cruise stream may be changed to other streams in the array, so the activity load is spread.

Tables Ia/Ib below provide illustrative values of hydrogen gas flow in accordance with the present disclosure.

TABLE Ia / Ib

| | CURRENT (A) | | | | | |
|---|---|---|---|---|---|---|
| | 40 | 100 | 200 | 300 | 450 | 600 |
| | Motive Gas | | | | | |
| | Hydrogen ($H_2$) | Hydrogen ($H_2$) | Hydrogen ($H_2$) | Hydrogen ($H_2$) | Hydrogen ($H_2$) | Hydrogen ($H_2$) |
| Molecular Weight (g/mol) | 2.02 | 2.02 | 2.02 | 2.02 | 2.02 | 2.02 |
| Motive Flow rate (lb/hr) | 1.67 | 4.17 | 8.34 | 12.51 | 18.77 | 25.38 |
| Max Flow (Transient) | 1.82 | 4.56 | 9.12 | 13.69 | 20.53 | 27.76 |
| Motive Pressure (psig) | Pressure can be a function of the discharge pressure target | | | | | |
| Max. Line pressure (psig) | 217.50 | 217.50 | 217.50 | 217.50 | 217.50 | 217.50 |
| Operating Motive pressure range (psig) | 0 to 43.5 psig | | | 0 to 43.5 psig | | |
| Temperature degC. min | 15.00 | 15.00 | 15.00 | 15.00 | 15.00 | 15.00 |
| Temperature degC. max | 70.00 | 70.00 | 70.00 | 70.00 | 70.00 | 70.00 |
| Suction Gas | Humidified Hydrogen ($H_2$) | Humidified Hydrogen ($H_2$) | Humidified Hydrogen ($H_2$) | Humidified Hydrogen ($H_2$) | Humidified Hydrogen ($H_2$) | Humidified Hydrogen ($H_2$) |
| Molecular Weight (g/mol) | 10.90 | 8.30 | 7.00 | 7.00 | 7.00 | 7.00 |
| Water Vapor Flow Rate (lb/hr) | 0.20 | 0.49 | 0.99 | 1.48 | 2.23 | 2.97 |
| Suction Flow rate (lb/hr) | 0.57 | 1.41 | 2.84 | 4.25 | 6.38 | 8.49 |
| Pressure (psig) | 3.20 | 4.18 | 8.18 | 10.43 | 13.85 | 17.25 |
| Temperature degC. min | 15.00 | 15.00 | 40.00 | 40.00 | 40.00 | 40.00 |
| Temperature degC. max | 70.00 | 70.00 | 70.00 | 70.00 | 70.00 | 70.00 |
| Optimum temperature degC. | 65.00 | 65.00 | 65.00 | 65.00 | 65.00 | 65.00 |
| Discharge pressure (psig) | 3.80 | 4.92 | 9.16 | 11.67 | 15.44 | 19.22 |

Figure 11:
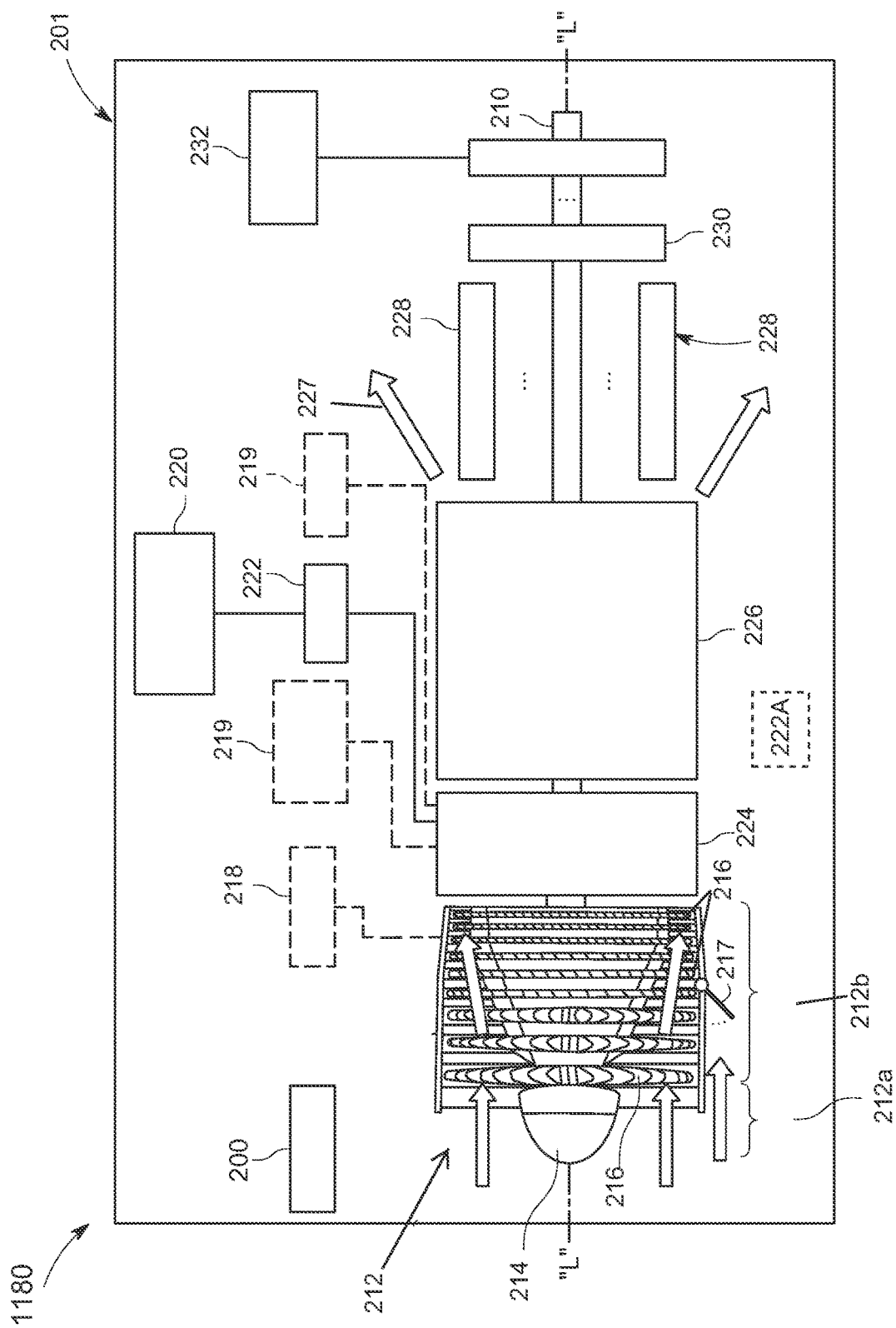
FIG. 11 is a schematic view of an integrated hydrogen fuel-cell-electric engine system in accordance with our prior U.S. application Ser. No. 16/950,735.

FIG. 11 illustrates an integrated hydrogen-electric engine system 201 that may be utilized, for example, in a turboprop or turbofan system to provide a streamlined, light-weight, power-dense and efficient system, in accordance with our aforesaid U.S. application Ser. No. 16/950,735. In general, integrated hydrogen-electric engine system 201 includes an elongated shaft 210 that defines a longitudinal axis "L" and extends through the entire powertrain of integrated hydrogen-electric engine system 201 to function as a common shaft for the various components of the powertrain. Elongated shaft 210 supports propulsor 214 (e.g., a fan or propeller) and a multi-stage air compressor system 212, a pump 222 in fluid communication with a fuel source (e.g., liquid hydrogen), a heat exchanger 224 in fluid communication with multi-stage air compressor system 212, a fuel-cell 226 (e.g., a fuel-cell stack) in fluid communication with heat exchanger 224, and a motor assembly 230 disposed in electrical communication with inverters 228. Alternatively, one or more components, e.g., pump 222A shown in phantom, may be electrically driven by output from fuel-cell 226.

Propulsor 214 includes an air inlet portion 212a at a front end thereof and a compressor portion 212b that is disposed proximally of air inlet portion 212a for uninterrupted, axial delivery of airflow in the proximal direction. Compressor portion 212b supports a plurality of longitudinally spaced-apart rotatable bladed compressor wheels 216 (e.g., multi-stage) that rotate in response to rotation of elongated shaft 210 for compressing air received through air inlet portion 212a for pushing the compressed air to a fuel-cell 226 for conversion to electrical energy. As can be appreciated, the number of compressor wheels 216 and/or diameter, longitudinal spacing, and/or configuration thereof may be modified as desired to change the amount of air supply, and the higher the power, the bigger the propulsor 214. These compressor wheels 216 may be implemented as axial or centrifugal compressor stages. Further, the compressor may have one or more bypass valves and/or wastegates 217 to regulate the pressure and flow of the air that enters the downstream fuel-cell, as well as to manage the cold air supply to any auxiliary heat exchangers in the system.

Compressor 212 optionally may be mechanically coupled to elongated shaft 210 via a gearbox 218 to change (increase and/or decrease) propulsor RPM.

Integrated hydrogen-electric engine system 201 further includes a gas management system such as a heat exchanger 224 disposed concentrically about elongated shaft 210 and configured to control thermal and/or humidity characteristics of the compressed air from air compressor system 212 for conditioning the compressed air before entering fuel-cell 226. Integrated hydrogen-electric engine system 201 further also includes a fuel source 220 of cryogenic fuel (e.g., liquid hydrogen—LH2, or cold hydrogen gas) that is operatively coupled to heat exchanger 224 via a pump 222 configured to pump the fuel from fuel source 220 to heat exchanger 224 for conditioning compressed air. In particular, the fuel, while in the heat exchanger 224, becomes gasified because of heating (e.g., liquid hydrogen converts to gas) removes heat from the system. The hydrogen gas is then heated in the heat exchanger 224 to a working temperature of the fuel-cell 226, which results in a control of flow through the heat exchanger 224. In embodiments, a heater 219 may be coupled to or included with heat exchanger 224 to increase heat as necessary, for instance, when running under a low power regime or under cold ambient conditions. Additionally, and/or alternatively, one or more fuel-cells 226, inverters 228 and motor assemblies 230 may be coupled to heat exchanger 224 for fluid communication with the cooling/heating loops and respective components as necessary. Such heating/cooling control may be managed, for instance, via controller 200 of integrated hydrogen-electric engine system 201. In embodiments, fuel source 220 may be disposed in fluid communication with one or more of fuel-cells 226, inverters 228, motor assembly 230, or any other suitable component to facilitate cooling of such components.

Pump 222 also may be coaxially supported on elongated shaft 210 for actuation thereof in response to rotation of elongated shaft 210. Heat exchanger 224 is configured to cool the compressed air received from air compressor system 212 with the assistance of the pumped cryogenic fluid.

The integrated hydrogen-electric engine system 201 further includes an energy core in the form of a fuel-cell 226, which may be circular, and is also coaxially supported on elongated shaft 210 (e.g., concentric) such that air channels through fuel-cell 226 may be oriented in parallel relation with elongated shall 210 (e.g., horizontally or left-to-right). Fuel-cell 226 may be in the form of a proton-exchange membrane fuel-cell (PEMFC). The fuel-cells 226 are configured to convert chemical energy liberated during the electrochemical reaction of hydrogen and oxygen to electrical energy. Depleted air and water vapor are exhausted from fuel-cell 226 via exhaust 227. The electrical energy generated from fuel-cell 226 is then transmitted to inverters 228 and then motor assembly 230, which are also coaxially/concentrically supported around elongated shaft 210. In aspects, integrated hydrogen-electric engine system 101 may include any number of external radiators or heaters 219 for facilitating airflow and adding, for instance, additional cooling. Notably, fuel-cell 226 may include liquid-cooled and/or air-cooled cell types so that additional cooling may be performed by external radiators or other devices.

One or more inverters 228 is configured to convert the direct current to alternating current for actuating one or more of a plurality of motors 230 in electrical communication with the inverters 228. The motor assembly 230 is configured to drive (e.g., rotate) the elongated shaft 210 in response to the electrical energy received from fuel-cell 226 for operating the components on the elongated shaft 210 as elongated shaft 210 rotates.

In aspects, one or more of the inverters 228 may be disposed between motors 230 (e.g., a pair of motors) to form a motor subassembly, although any suitable arrangement of motors 230 and inverters 228 may be provided. The motor assembly 230 may include any number of motor subassemblies supported on elongated shaft 210 for redundancy and/or safety. Motor assembly 230 may include any number of fuel-cell modules 226 configured to match the power of the motors 230 and the inverters 228 of the subassemblies. In this regard, for example, during service, the fuel-cell modules 226 may be swapped in/out. Each fuel-cell module 226 may provide any power, such as 400 kW or any other suitable amount of power, such that when stacked together (e.g., 4 or 5 modules), total power may be about 2 megawatts on the elongated shaft 210. In embodiments, motors 230 and inverters 228 may be coupled together and positioned to share the same thermal interface so a motor casing of the motors 230 is also an inverter heat sink so only a single cooling loop goes through motor assembly 230 for cooling the inverters 228 and the motors 230 at the same time. This reduces the number of cooling loops and therefore the complexity of the system.

Up to this point, the integrated hydrogen cell-electric engine is essentially identical to the integrated hydrogen fuel-cell-electric engine described in our aforesaid co-pending U.S. application Ser. No. 16/950,735, filed Nov. 17, 2020, the contents of which are incorporated herein by reference.

Figure 12:
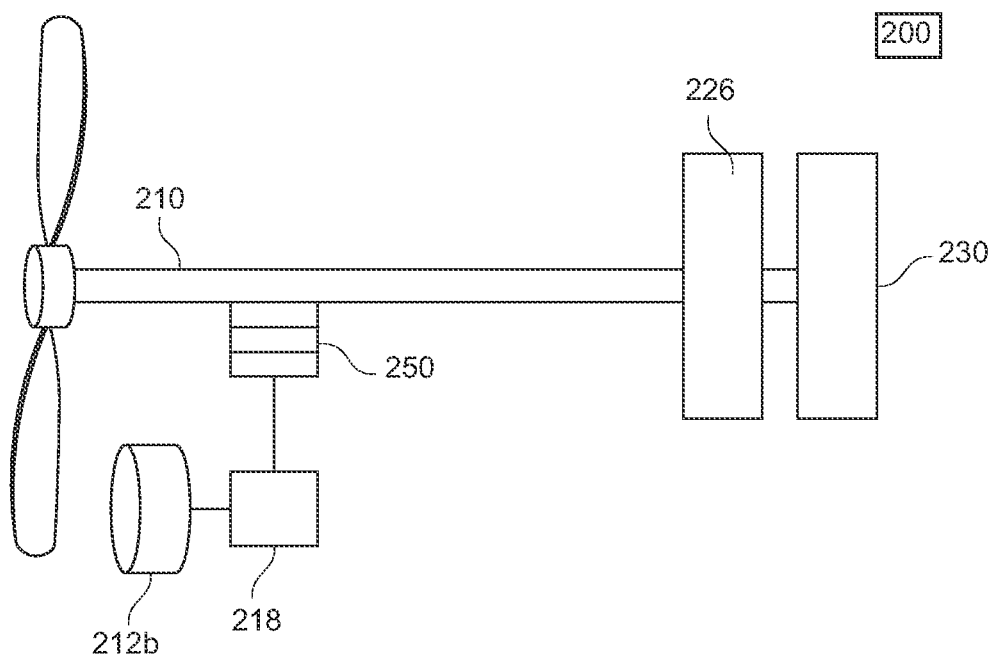
FIG. 12 is a schematic view of an integrated hydrogen-electric engine system in accordance with a first embodiment of the disclosure.

Referring to FIG. 12, in accordance with one aspect of the present disclosure, we provide an integrated fuel-cell-electric engine including fuel-cell modules 226 and motors 230, and in which the compressor 212b is connected via gearbox 218 which preferably comprises a multi-speed gearbox through an engagement mechanism such as a clutch 250 to the propulsor shaft 210. Clutch 250, which may be a magnetic clutch, a hydraulic clutch or pneumatic clutch or a mechanical or electromechanical clutch, is controlled via controller 200 so that the compressor 212b is driven in response to air consumption needs of the fuel-cell. Thus the gearbox may be disengaged, i.e., the clutch freed under low-power high ambient air pressure conditions, for example, at sea level, taxiing and descent. And/or the clutch may be engaged to engage the gearbox selected to low gear speed for low compressor speed operation, and the clutch engaged with the gearbox selected to high gear speed for high power demands and/or low ambient pressure conditions, i.e., climbing and cruising above 10,000 MSL.

Figure 13:
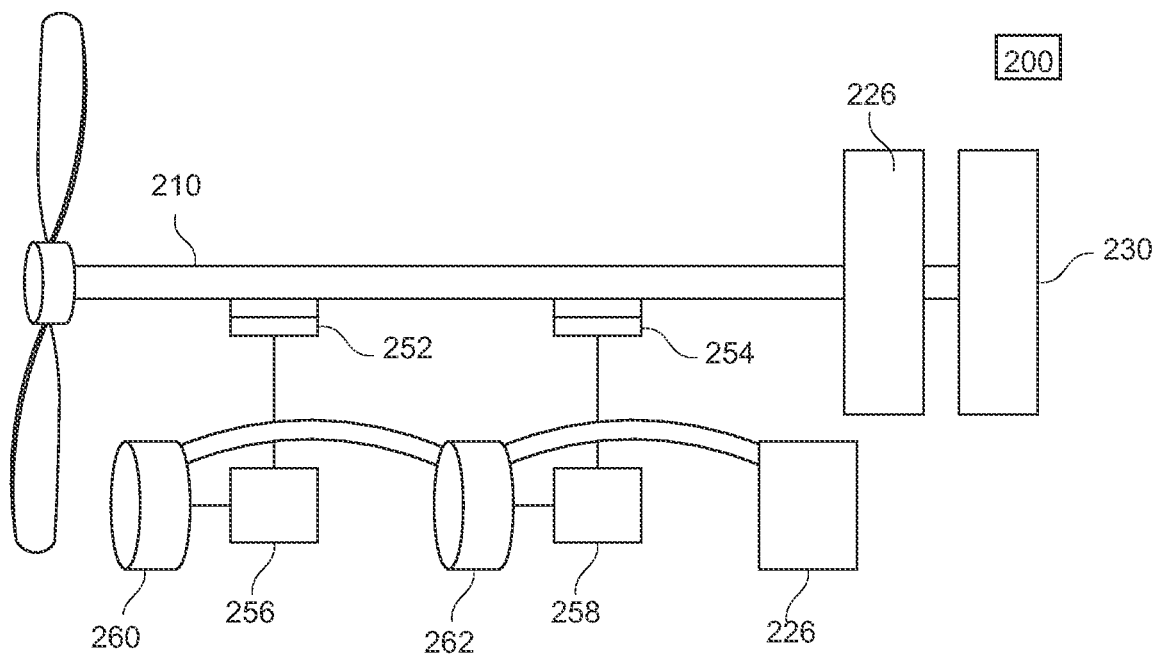
FIGS. 13-15 are views similar to FIG. 12 of second, third and fourth embodiment of the disclosure.

In use, the clutch 250 is engaged/disengaged to drive the compressor 212b by a controller 200 in response to aircraft and fuel-cell states comprising criteria including one or more of:

Throttle position
Oxygen depletion
Hydrogen depletion
Hydrogen demand
Phase of flight Referring to FIG. 13, in yet another embodiment, which includes fuel-cell modules 226 and motors 230, multiple clutches 252, 254 and multiple gearboxes 256, 258 may be arranged on the same shaft 210. This permits us to employ fixed gear ratios in the different gearboxes 256, 258, simplifying the gearboxes which are connected to the common propulsor shaft 210. In such embodiment the compressors comprise two compressors 260 and 262, connected in series to the fuel-cell 226.

More particularly, in this embodiment we include a first clutch 252 connected via a first gearbox 256 for driving a first compressor 260 and a second clutch 254 connected to a second gearbox 258 for driving a second compressor 262. As before, the clutches 252, 254 are engaged/disengaged to drive the compressors 260, 262 in response to aircraft and fuel-cell needs.

Figure 14:
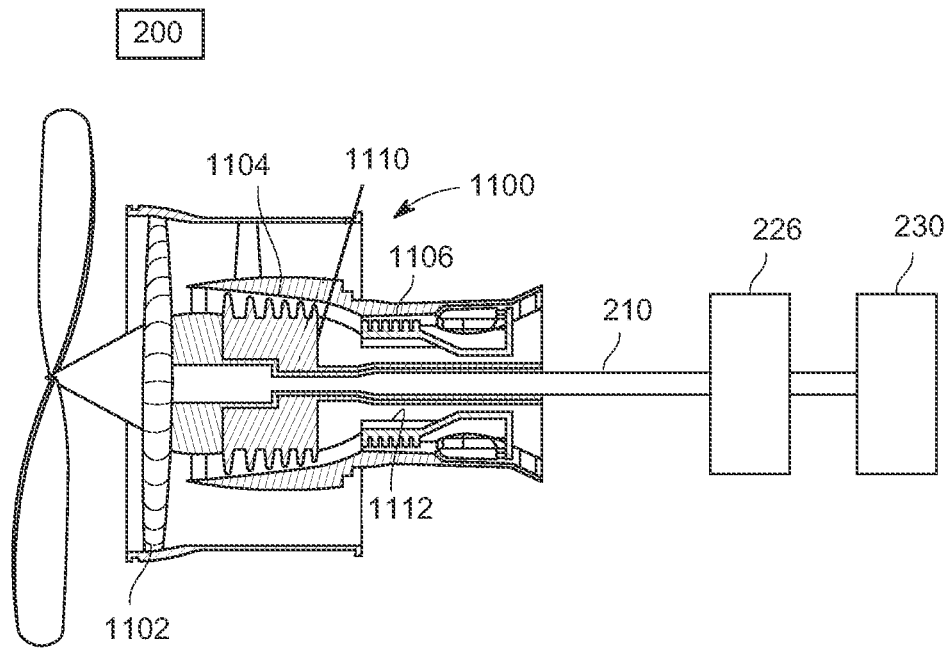

Referring to FIG. 14, in yet another embodiment, which includes fuel-cell modules 226 and motors 230, the integrated hydrogen-electric engine system comprises a multi-spool engine 1100, including a low-pressure compressor 1102, and medium-pressure compressor 1104, situated downstream from the low pressure compressor, and a high-pressure compressor 1106 situated downstream from the medium pressure compressor 1104. The medium pressure compressor 1104 and the high pressure compressors 1106 are connected to a common shaft 210 through clutches 1110, 1112, respectively which include dogs and spines which intermesh when the effective clutches are in engaged conditions. As before, the clutches 1110, 1112 are engaged under controller 200 in response to aircraft and fuel-cell needs.

A feature of multi spool engines is that it permits us to provide constant pressure to a fuel-cell while varying flow rate or outside ambient air pressure with improved efficiency relative to fixed-ratio compressors.

Low altitude: inner compressor, and

Figure 15:
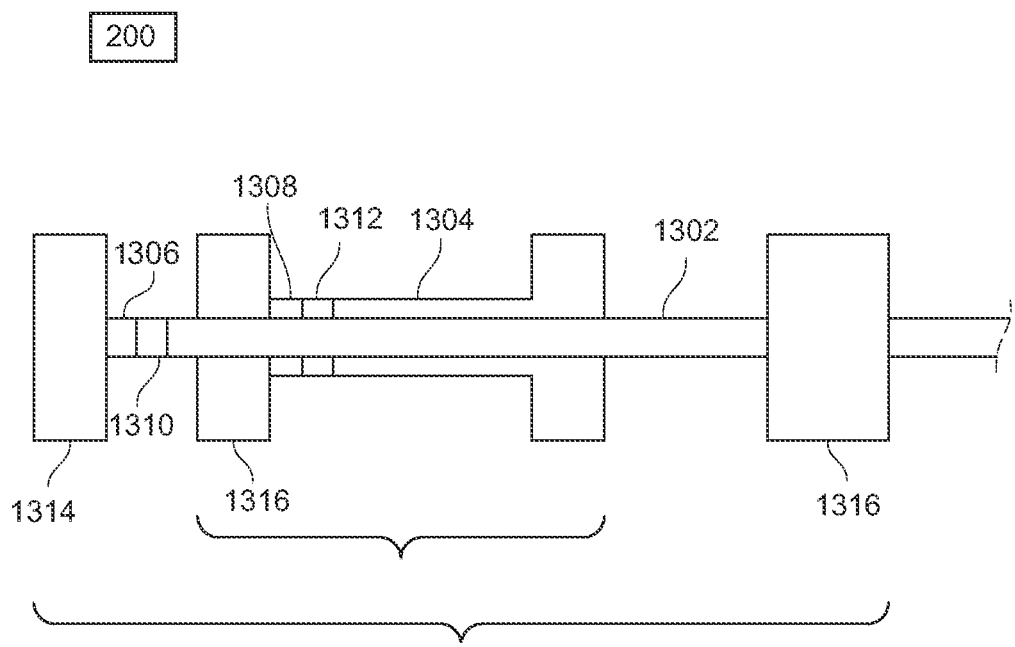

High altitude: pre-compressor; which at low altitude/ground operations:
  i. Bypassed with a gate
  ii. Design blades so not much air resistance
  iii. Variable guide vanes to reduce air resistance Referring also to FIG. 15, in yet another embodiment the integrated hydrogen-electric engine system comprises first and second coaxial shafts 1302, 1304 connected via engagement mechanisms 1306, 1308 and gearboxes 1310, 1312 to first and second stage compressors 1314, 1316, respectively. First and second coaxial shafts 1302, 1304 are configured to run independently from one another, i.e., at different speeds. Thus, the second stage compressor 1316, for example, may be stationary or run more slowly than the first stage compressor 1314 on the ground and at low altitude, and driven by fuel-cell exhaust gasses at higher altitudes where more compression is required. Also, by engaging/disengaging the engagement mechanisms 1306, 1308 and selecting gears via gearbox 1310, 1312 we can better tailor airflow to fuel-cell demands.

As before, controller 200 is provided, configured to receive among data, aircraft location, i.e., altitude, ambient air pressure, temperature and relative humidity, air stream speed and direction, etc., from various sensors (not shown), and includes a memory device including operating instructions.

Features and advantages of the present disclosure include:
Reliability
Operation over wide ambient pressure range
More power to propulsor at sea level where the compressor has less work to do as a result of the higher ambient air pressure.

Figure 16:
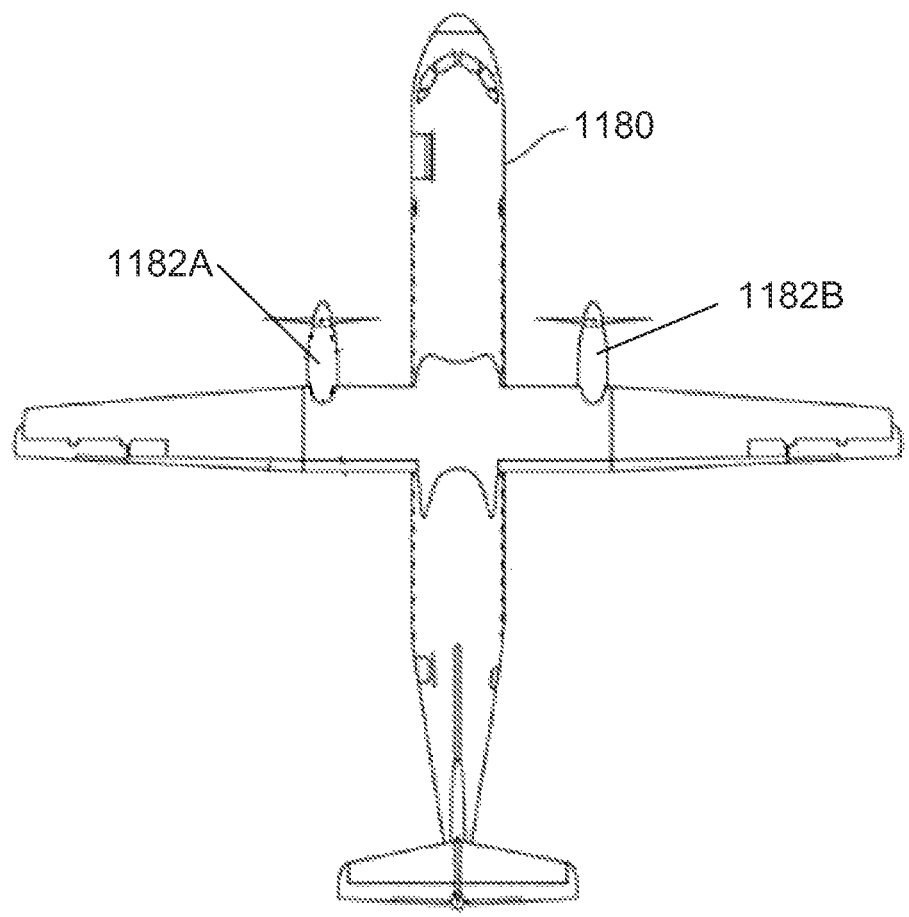
FIG. 16 is a schematic view of an integrated hydrogen-electric engine system installed on an airplane in accordance with the present disclosure.

FIG. 16 illustrates a pair of integrated hydrogen-electric engines 1182A, 1182B having air compressors in accordance with the present disclosure installed on an airplane 1180.

Figure 17:
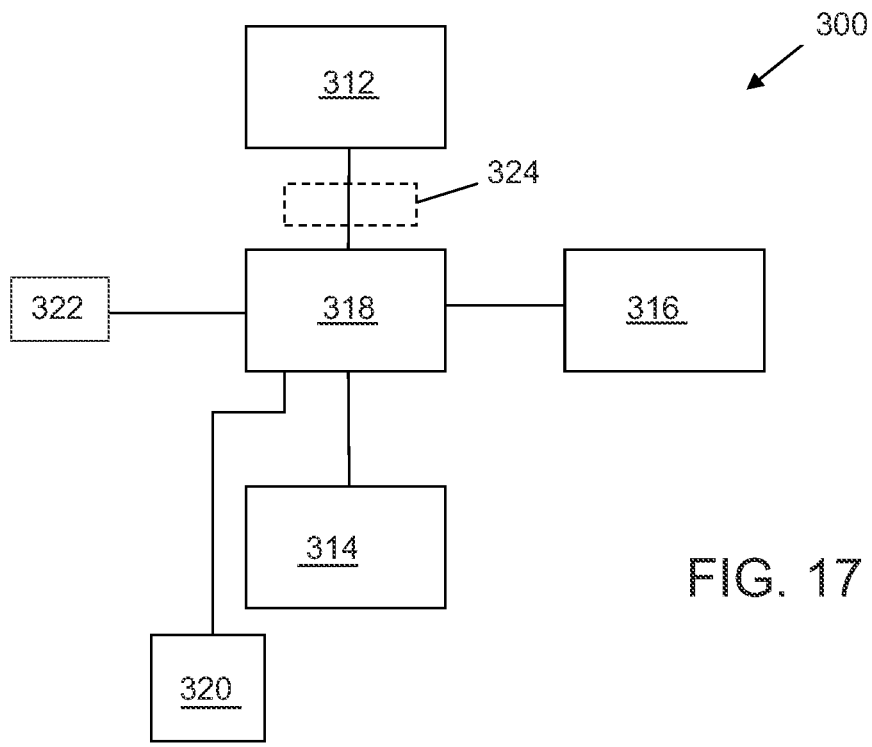
FIG. 17 is a schematic view of an integrated renewable energy source power generator in combination with an electrolyzer system in accordance with the present disclosure.

Referring to FIG. 17, an integrated hydrogen production system 300 in accordance with the present disclosure includes a renewable power energy generator 312, an energy storage battery 314, an electrolyzer 316, an energy power controller 318, and a system controller 320.

The renewable power generator may comprise a direct conversion solar cell array or thermal energy solar collector connected to a thermal energy powered electrical generator shown in phantom at 324. Alternatively, renewable energy generator 312 may comprise a mechanical energy harvester such as wind power or wave power electrical energy generator. Electrolyzer 316 may comprise a conventional electrolyzer configured to produce hydrogen via electrolysis. Electrolyzer 316 may be a polymer electrolyte membrane electrolyzer, an alkali electrolyzer or a solid oxide electrolyzer.

Battery 314 may comprise any form of energy storage system for storing energy from the renewable power generator 312. Battery 314 may comprise a conventional lithium ion battery, a conventional lead acid battery, a flow cell battery, or a molten salt battery. Alternatively, battery 314 may comprise a system for converting electrical energy from renewable power energy 312 to another energy form which may then be reconverted to electrical energy. Such energy storage system may include, for example, a gravitational energy storage system configured to pump water or to lift weights, which are then released to provide electricity via a mechanical electricity generator. Alternatively, battery 314 may comprise a thermal energy storage system, a hydraulic energy storage system, or a fly wheel system capable of converting electrical energy to storage and reconverting the stored energy to electricity.

The system 300 also includes a power controller 318 configured for routing power directly from renewable power generator 312 to electrolyzer 316 and/or to battery 314, as the case may be, and from the grid 322 as will be discussed below. The system also includes a system controller 320 configured to control operation of the several subsystems, i.e., the battery, the electrolyzer, etc.

A feature and advantage of the subject disclosure is to size the battery 314 to accept essentially the maximum power from the renewable power generator over 324 hours, i.e., such that the battery 314 is capable of storing the daily average production from the renewable power generator 312, while sizing the electrolyzer 316 to consume the 24 hour power production over 24 hours. This results in a significantly reduced capital expenditure for the electrolyzer which in turn results in significantly reduced costs of hydrogen generation. As noted supra, system 300 also may be connected to the grid 322 to permit intake of electrical energy from the grid during off peak hours when electricity pricing is lower.

Figure 18:
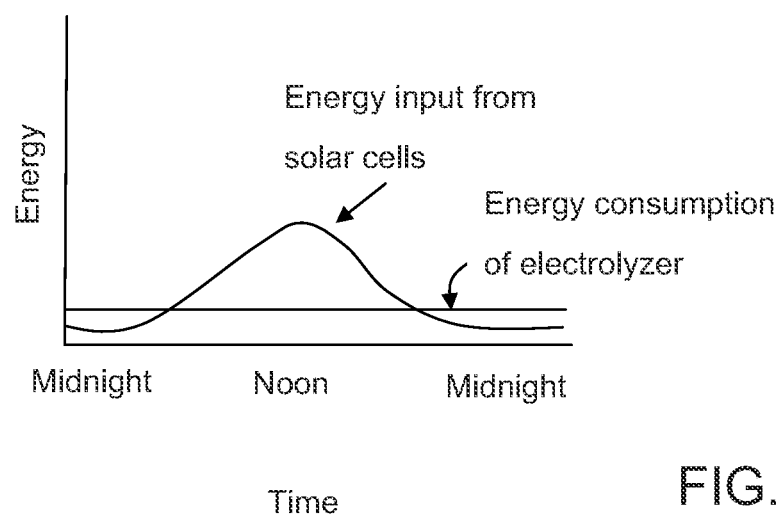
FIG. 18 is a diagram showing energy profiles of energy generation from a renewable energy power source and energy consumption from an electrolyzer over a 24 hour period in accordance with the present disclosure.

As shown in FIG. 18 a renewable power generator such as solar cell on a typical summer day in London may produce the bulk of its energy over 14 hours. Thus, by sizing electrolyzer 316 for maximum solar cell output over 24 hours, the electrolyzer may be sized for most efficient overall operation.

Figure 19:
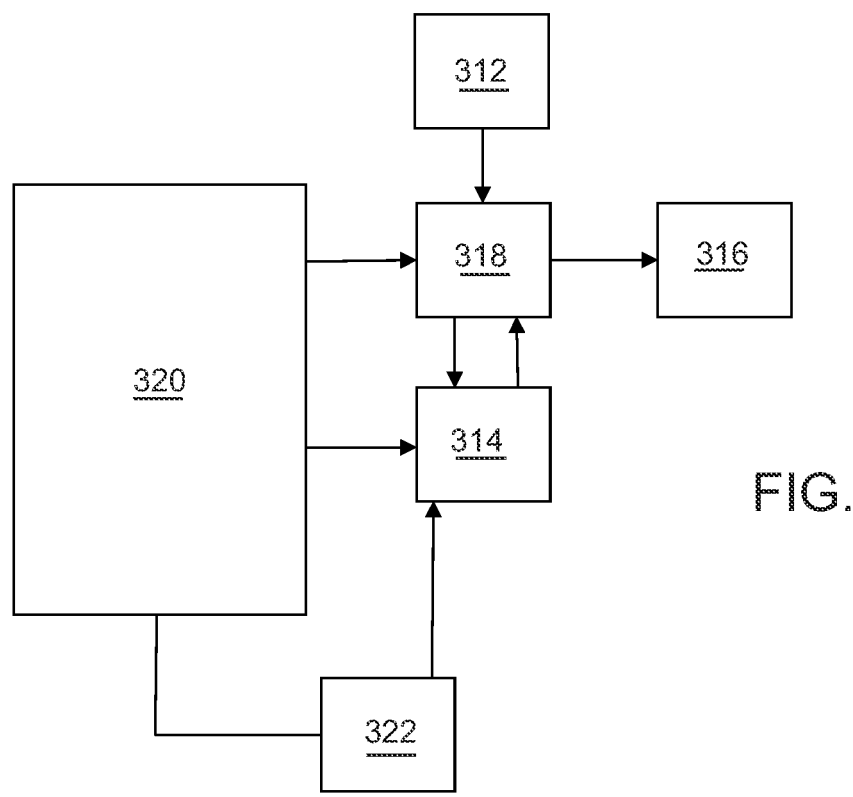
FIG. 19 is a block diagram of a control system for the integrated system of FIG. 17.

Referring to FIG. 19, an exemplary control system 320 in accordance with the present disclosure includes a controller programmed to control power controller 318 which is coupled with battery 314 and electrolyzer 316. Power controller 318 is controlled to route energy generated by renewable power energy generator 312 to electrolyzer 316 when power is being generated by a renewable power generator 312, and to route excess power from renewable power energy generator 312 to battery 314. When power generated by renewable power generator 312 falls below the design capacity of electrolyzer 316, controller 320 is configured to trigger power controller 318 to draw power from battery 312 to power electrolyzer 316.

Controller 320 also controls power controller 318 to shunt power from grid 322 directly to electrolyzer 316, or to battery 314 during off peak hours, when grid energy is less expensive. Also, if desired, the controller may take inputs from the grid operator (e.g., electricity pricing), hydrogen production requirements, renewable forecasts (e.g., weather), and produce control signals for the grid interface, the electrolysis system, renewable power generator (e.g., solar or wind), and associated components, to optimize overall economics of the operations to produce the lowest cost of each kilogram of green hydrogen.

The present system has several advantages:
the electrolyzer is smaller, resulting in a lower capital cost
the system is efficient, and can respond quickly to changes in energy production due, for example, to changes in weather

- the system may have lower maintenance costs due to isolating the electrolyzer from dynamic response stresses and due to avoiding cycling the pumps required to drive the electrolyzer
- the system permits us to purchase excess energy from the grid during off peak, e.g., when spot prices fall below the asconverted value of hydrogen.

Figure 20:
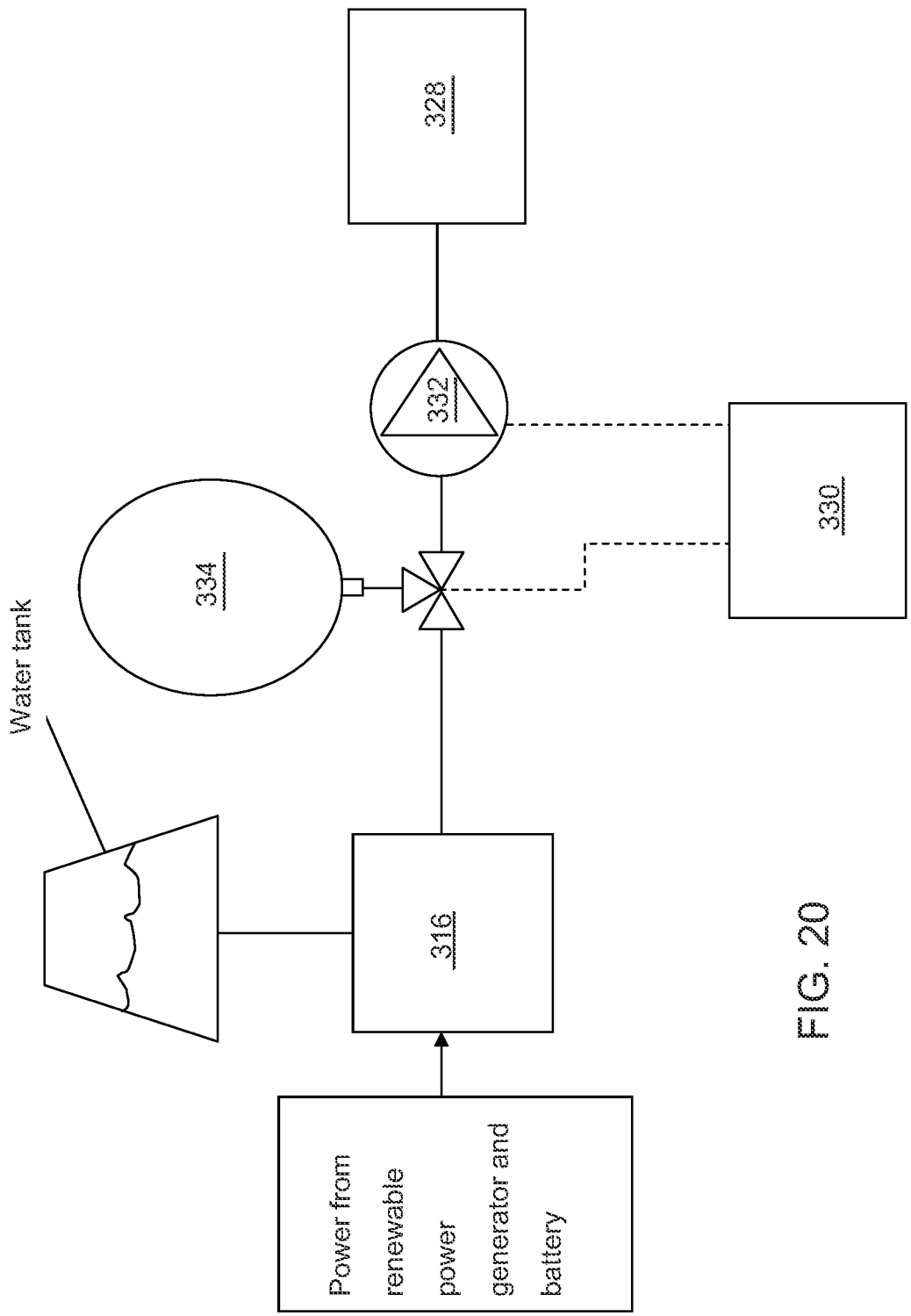
FIGS. 20-22 are schematic views similar to FIG. 17 of various alternative embodiments of integrated energy power generators in combination with an electrolyzer system in accordance with the present disclosure.

Referring to FIG. 20, in another embodiment hydrogen produced by the electrolyzer 316 is stored at low pressure, and only later compressed into one or more high pressure storage tanks 328 when a controller 330 runs the compressor pump 332 only after receiving a signal that electricity rates are low or excess renewable energy availability is high. For example, if the system is off-grid, energy availability may vary depending on sun position, clouds, wind speed, or other factors. In such an interim low pressure storage embodiment, the hydrogen may be stored in constant pressure (e.g. 1 bar) variable-volume containers such as one or more balloons 334. Excess renewable energy also may be directed to the grid when not required by the electrolyzer, battery or compressor pumps, etc.

Figure 21:
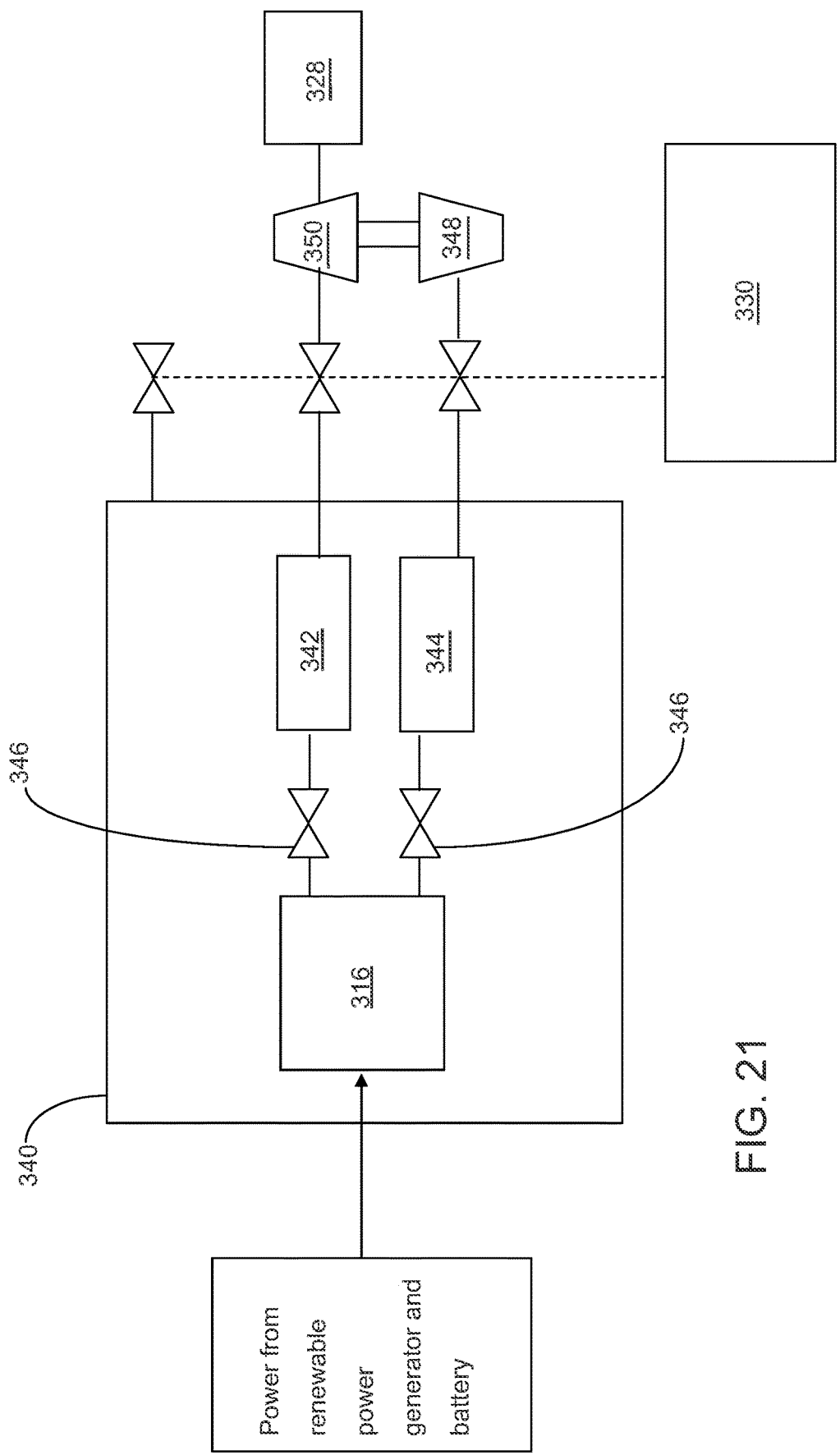
Figure 22:
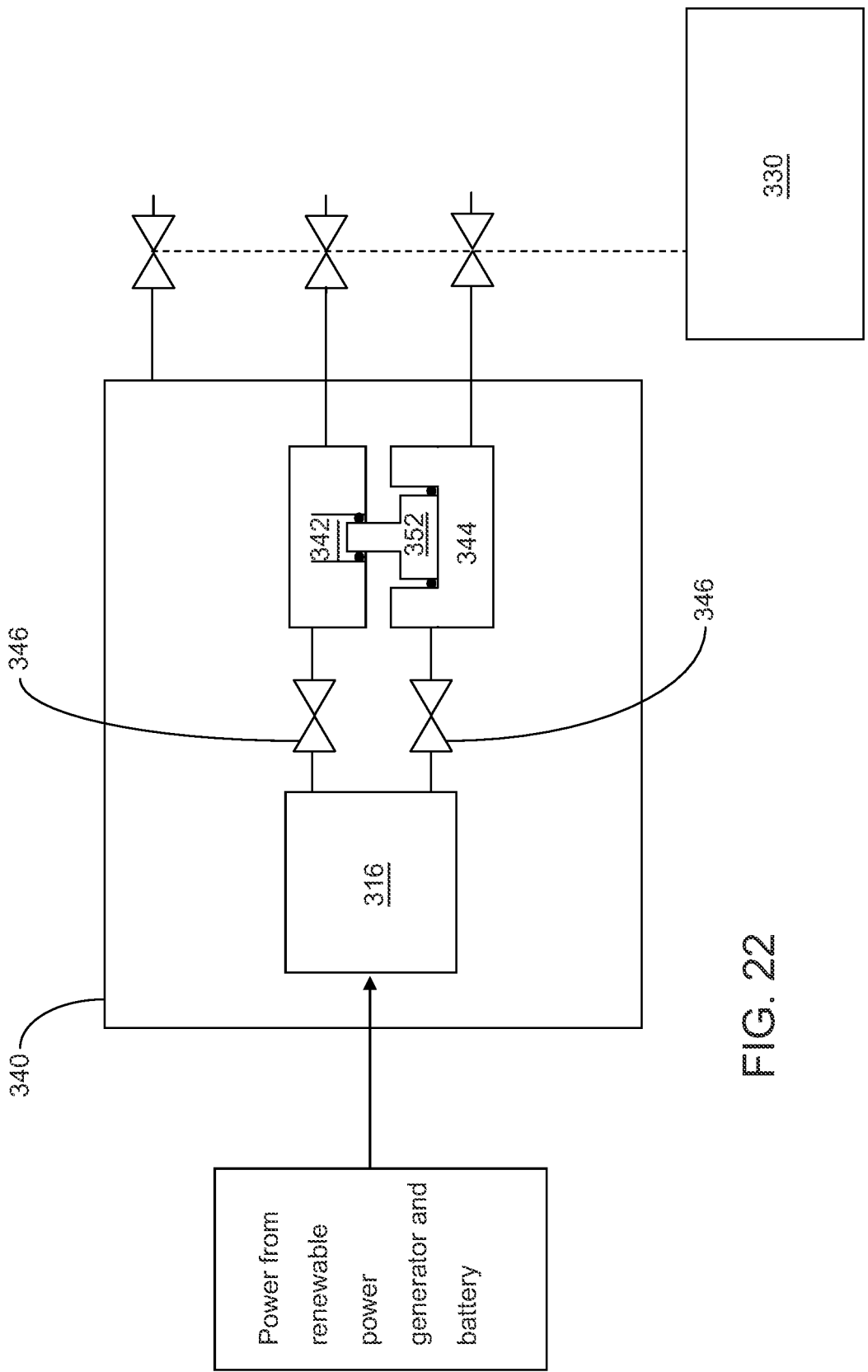

Referring to FIGS. 21 and 22, in other embodiments, we may enclose the electrolyzer in a pressure vessel 340 and stream the hydrogen and oxygen produced through valves into tanks 342, 344 disposed within the pressure vessel. This avoids the need for and the energy consumption of separate compressor pumps. Selected valves may be used, e.g., a check valve or pressure relief valve 346 with a spring seating the valve on the valve face to prevent pressurized gas back-flowing from a tank to the electrolyzer 316. Since less-valuable oxygen is thus stored at high pressure, it may be used to compress the hydrogen by releasing the pressurized oxygen across a turbine 348 whereby to drive a hydrogen gas compressor 350, as shown in FIG. 21. In another embodiment, we use the pressurized oxygen to directly do work against the hydrogen and increase the hydrogen pressure through a series of two or more pistons 352 of different sizes, as shown in FIG. 22. Thus we can give a substantial pressure increase to the hydrogen stream, while reducing the pressure of the oxygen stream. As before controller 330 is configured to control operation of the several subsystems.

FIG. 23 illustrates integrated hydrogen-electric engine system 400 that can be utilized, for example, in an aircraft turboprop or turbofan system, to provide a streamlined, light weight, power dense and efficient system. In general, integrated hydrogen-electric engine system 400 includes an elongated shaft 410 that extends through the entire powertrain of integrated hydrogen-electric engine system 400 to function as a common shaft for the various components of the powertrain. Elongated shaft 410 supports propulsor 414 (e.g., a fan or propeller) and a multi-stage air compressor system 412, a pump (not shown) in fluid communication with a fuel source (e.g., hydrogen), a heat exchanger radiator 424 in fluid communication with air compressor system 412, a fuel-cell stack 426 in fluid communication with heat exchanger radiator 424, and a motor assembly 428 disposed in electrical communication with fuel-cell stack 426.

Air compressor system 412 of integrated hydrogen-electric engine system 400 includes an air inlet portion 412a at a proximal end thereof and a compressor portion 412b that is disposed proximally of air inlet portion 412a for uninterrupted, axial delivery of airflow in the proximal direction. Compressor portion 412b supports a plurality of longitudinally spaced-apart rotatable compressor wheels (not shown) (e.g., multi-stage) that rotate in response to rotation of elongated shaft 410 for compressing air received through air inlet portion 412a for pushing the compressed air to fuel-cell stack 426. As can be appreciated, the number of compressor wheels/stages and/or diameter, longitudinal spacing, and/or configuration thereof can be modified as desired to change the amount of air supply, and the higher the power, the bigger the propulsor 414. These compressor wheels can be implemented as axial or centrifugal compressor stages. Further, the compressor can have one or more bypass valves and/or wastegates (not shown) to regulate the pressure and flow of the air that enters the downstream fuel-cell, as well as to manage the cold air supply to any auxiliary heat exchangers in the system.

Compressor 412 may optionally be mechanically coupled to elongated shaft 410 via a gearbox 418 to change (increase and/or decrease) compressor turbine RPM and to change the airflow to fuel-cell stack 426. For instance, gearbox 418 may be configured to enable the air flow, or portions thereof, to be exhausted for controlling a rate of airflow through the fuel-cell stack 426, and thus, the output power.

Integrated hydrogen-electric engine system 400 further includes a gas management system such as a heat exchanger radiator 424 disposed concentrically about elongated shaft 410 and configured to control thermal and/or humidity characteristics of the compressed air from air compressor system 412 for conditioning the compressed air before entering fuel-cell stack 426. Integrated hydrogen-electric engine system 400 further also includes a fuel source of fuel (e.g., liquid hydrogen—LH2, or cold hydrogen gas) that is operatively coupled to heat exchanger radiator 424 via a pump (not shown) configured to pump the fuel from fuel source to heat exchanger radiator 424 for conditioning the compressed air. In particular, the fuel, while in the heat exchanger 424, becomes gasified because of heating (e.g., liquid hydrogen converts to gas) to take the heat out of the system. The hydrogen gas then gets heated in the heat exchanger radiator 424 to a working temperature of the fuel-cell 426 which also takes heat out of the compressed air, which results in a control of heat flow through the heat exchanger radiator 424. An optional heater may be coupled to or included with heat exchanger radiator 424 to increase heat as necessary to warm the hydrogen fuel, for instance, when running under a low power regime. Additionally, and/or alternatively, motor assembly 428 may be coupled to heat exchanger radiator 424 for looping in the cooling/heating loops from motor assembly 428 as necessary. Such heating/cooling control may be managed, for instance, via a controller (not shown). In embodiments, the fuel source may be disposed in fluid communication with motor assembly 428 or any other suitable component to facilitate cooling of such components.

The pump also may be coaxially supported on elongated shaft 410 for actuation thereof in response to rotation of elongated shaft 410. Heat exchanger radiator 424 is configured to cool the compressed air received from air compressor system 412 with the assistance of the pumped liquid hydrogen.

Figure 24:
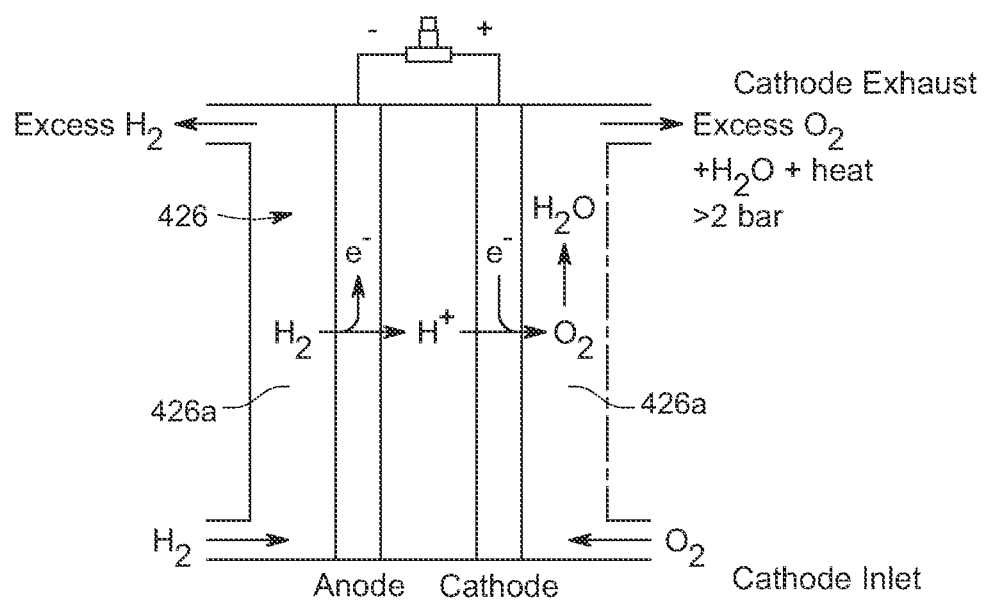
FIG. 24 is a schematic view of a fuel-cell of the integrated hydrogen-electric engine system of FIG. 23.

With reference also to FIG. 24, integrated hydrogen-electric engine system 400 further includes an energy core in the form of a fuel-cell stack 426, which may be circular, and is also coaxially supported on elongated shaft 410 such that air channels 426a of fuel-cell stack 426 may be oriented in parallel relation with elongated shaft 410 (e.g., horizontally or left-to-right). Fuel-cell stack 426 may be in the form of a low temperature proton-exchange membrane (LTPEM) fuel-cell or a high temperature proton-exchange membrane (HT-PEM) fuel-cell. The fuel-cells of the fuel-cell stack 426 are configured to convert chemical energy liberated during the electrochemical reaction of hydrogen and oxygen to electrical energy (e.g., direct current). Depleted air, water vapor and heat are exhausted from the cathode side of fuel-cell stack 426, and injected into the cooling duct outlet of the heat exchanger radiator 424 to boost the cooling capacity of the heat exchanger radiator 424 by increasing the mass flow of air through the heat exchanger radiator 424 through application of the Bernoulli effect as will be described below. The electrical energy generated from fuel-cell stack 426 is then transmitted to motor assembly 428, which is also coaxially/concentrically supported on elongated shaft 410. Integrated hydrogen-electric engine system 400 may include any number of external radiators (not shown) for facilitating airflow and adding, for instance, additional cooling. Notably, fuel-cell stack 426 may include liquid cooled and/or air cooled cell types so that cooling loads are integrated into heat exchanger 428 for reducing total amount of external radiators needed in the system. Further details of the air compressor system and the pump are found in our co-pending PCT Application No. PCT/US2022/73127, filed Jun. 23, 2022, the contents of which are incorporated herein by reference.

Integrated hydrogen-electric engine system 400 further includes a controller 4200 (e.g., a full authority digital engine (or electronics) control (e.g., a FADEC) for controlling the various aspects of the integrated hydrogen-electric engine system 400 and/or other components of aircraft system. For instance, controller 4200 may be configured to manage a flow of liquid hydrogen, manage coolant liquids from the motor assembly 428, manage, for example, any dependent auxiliary heater for the liquid hydrogen, manage rates of hydrogen going into fuel-cell stack 426, manage rates of heated/cooled compressed air, and/or various flows and/or power of integrated hydrogen-electric engine system 400 including mass flow of cathode exhaust into the cooling duct outlet of the heat exchanger radiator 424 as will be described below. The algorithm for managing these thermal management components may be designed to ensure the most efficient use of the various cooling and heating capacities of the respective gases and liquids to maximize the efficiency of the system and minimize the volume and weight of same. For example, the cooling capacity of liquid hydrogen or cool hydrogen gas (post-gasification) can effectively be used to cool the hot compressor discharge air to ensure the correct temperature range in the fuel-cell inlet. Further, the cooling liquid from the motor-inverter cooling loop could be integrated into the master heat exchanger and provide the additional heat required to gasify hydrogen and heat it to the working fuel-cell temperature.

Figure 25:
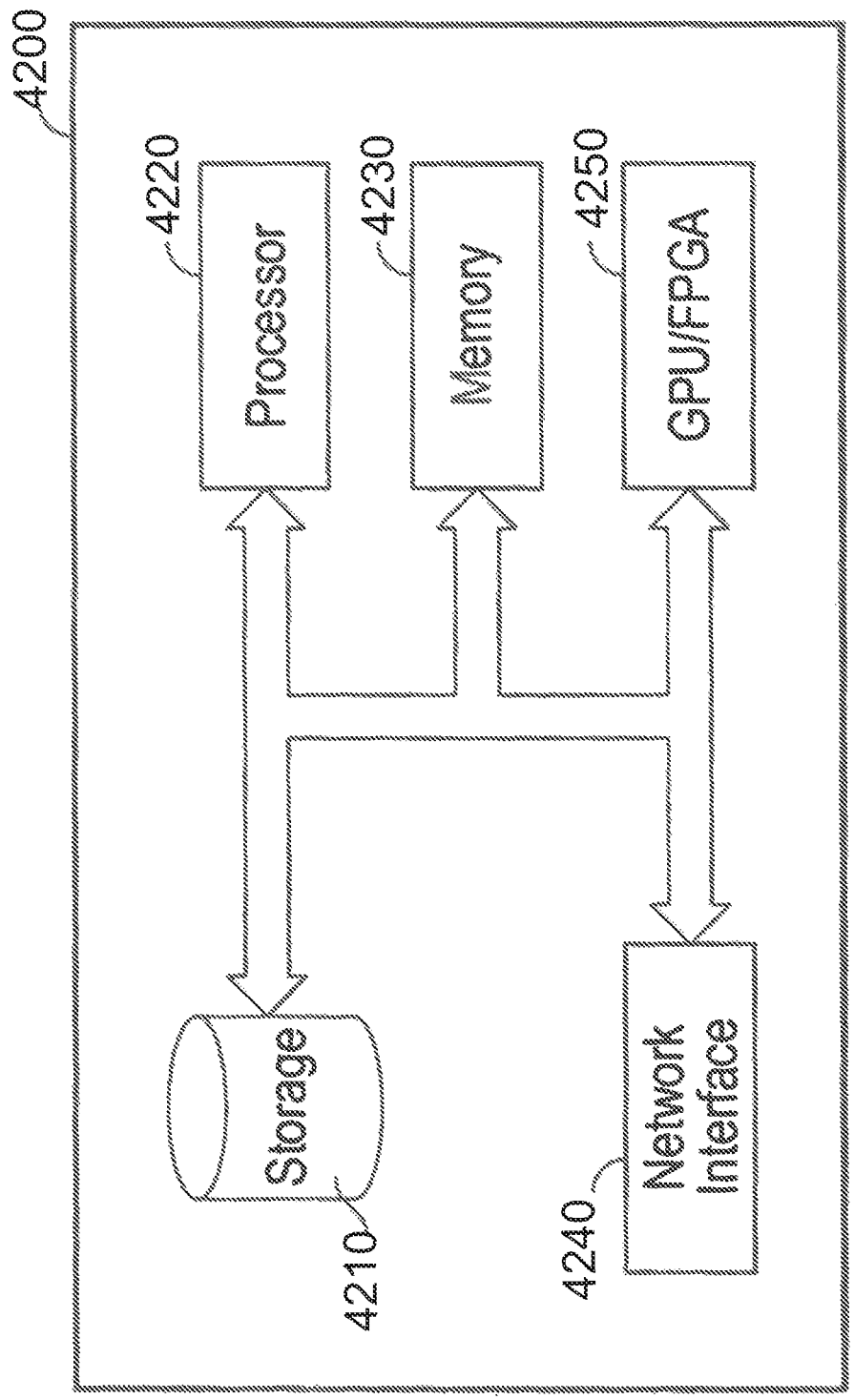
FIG. 25 is a block diagram of a controller configured for use with integrated hydrogen-electric engine system of FIG. 23.

FIG. 25 illustrates that controller 4200 includes a processor 4220 connected to a computer-readable storage medium or a memory 4230. The computer-readable storage medium or memory 4230 may be a volatile type memory, e.g., RAM, or a non-volatile type memory, e.g., flash media, disk media, etc. In various aspects of the disclosure, the processor 4220 may be another type of processor such as, without limitation, a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

Memory 4230 may be random access memory, read-only memory, magnetic disk memory, solid-state memory, optical disc memory, and/or another type of memory. Memory 4230 may be separate from the controller 4200 and may communicate with the processor 4220 through communication buses of a circuit board and/or through communication cables such as serial ATA cables or other types of cables. Memory 4230 includes computer-readable instructions that are executable by the processor 4220 to operate the controller 4200. In other aspects of the disclosure, the controller 4200 may include a network interface 4240 to communicate with other computers or to a server. A storage device 4210 may be used for storing data.

The disclosed method may run on the controller 4200 or on a user device, including, for example, on a mobile device, an IoT device, or a server system.

Controller 4200 is configured to receive among other data, the fuel supply status, aircraft location, and control, among other features, the pumps, motors, sensors, etc.

Further, as can be appreciated, the integrated hydrogen-electric engine system 400 may include any number and/or type of sensors, electrical components, and/or telemetry devices that are operatively coupled to controller 4200 for facilitating the control, operation, and/or input/out of the various components of integrated hydrogen-electric engine system 400 including specifically mass flow rate of cathode exhaust as will be described below, for improving efficiencies and/or determining errors and/or failures of the various components.

Figure 26:
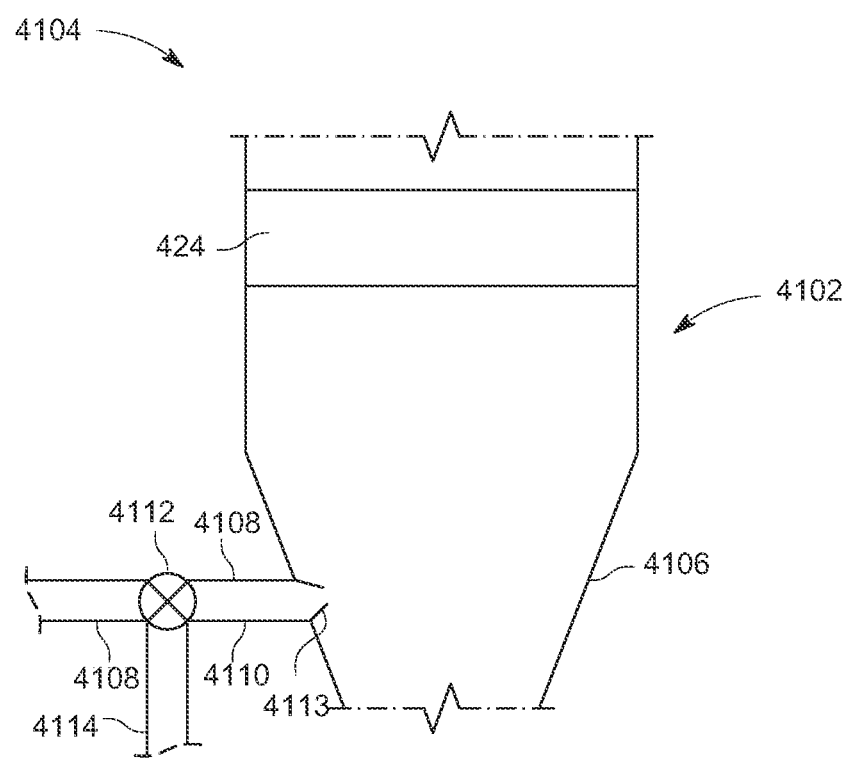
FIG. 26 is a schematic view of a portion of a ducted cooling system in accordance with the present disclosure.

Referring again to FIG. 23, ram air after passing through radiator 424 is streamed through exhaust nozzle 4102. Exhaust nozzle 4102 includes an inlet section 4104 upstream of heat exchanger radiator 424, and a tapered outlet section 4106. The cathode exhaust stream is plumbed to be injected via a flow control nozzle 4110 into the tapered outlet section 4106 via conduit 4108, wherein the cathode exhaust stream is mixed with air flowing from exhaust nozzle inlet section 4104 to exhaust nozzle outlet section 4106. As seen particularly in FIG. 26, flow control nozzle 4110 includes a tapered outlet 4113 resulting in an increase in the velocity of the fluid, i.e., the cathode exhaust stream exiting the nozzle 4110. This results in a decrease in pressure just beyond the outlet of the nozzle 4110 which in turn increases the velocity of the air through exhaust nozzle 4102. That is to say, the cathode exhaust stream velocity is accelerated immediately downstream of the nozzle 4110 which creates a low-pressure, i.e., suction, that pulls the flowing air stream at the outlet 4113 of the flow control nozzle 4110 through by shear mixing between the jet and entrained flow. This in turn increases the pressure drop and mass flow rate of air in the exhaust nozzle 4102. By way of example, when the flow control nozzle 4110 is activated during stationary condition, one may observe pressure drop immediately in front of the flow control nozzle 4110 outlet 4113. As a result, the air mass flowing past the flow control nozzle 4110 gets pulled and velocity is established. A variable flow control valve 4112 may be used to regulate the mass flow rate or the pressure of the cathode exhaust at flow control nozzle 4110. A bypass outlet 4114 may be provided to maintain the back pressure of the fuel-cell chamber when the total cathode exhaust is not fully ejected through the flow control nozzle 4110.

Figure 27A:
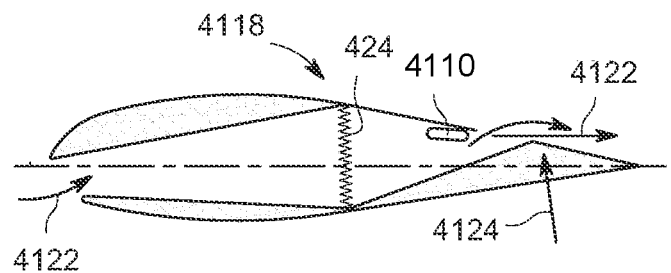
FIGS. 27A-27D are schematic views of ducted cooling systems incorporated into aircraft wings in accordance with the present disclosure.
Figure 27B:
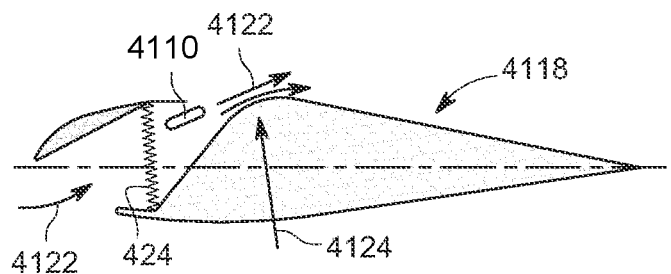
Figure 27C:
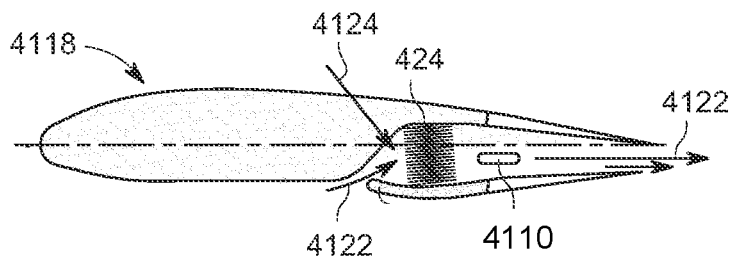
Figure 27D:
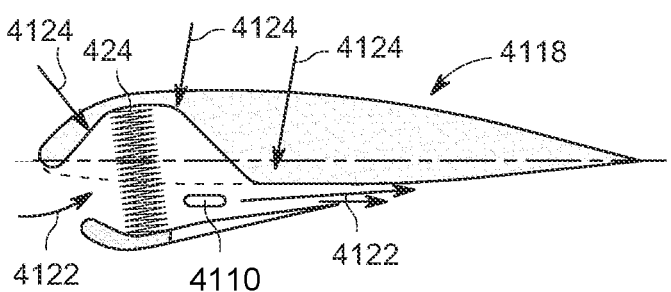

The cathode exhaust may be plumbed in the cooling ducting system as shown in FIG. 23, or by different passive flow control methods depending on the ducting design. FIGS. 27A, 27B, 27C and 27D, present cathode ejector locations in different ducting systems analogous, by example, to the wing 4118 of an aircraft. In each use, the cathode flow nozzle is labeled at 4110. Arrows labeled 4122 show the direction of ejector flows. Arrows 4124 show where the airflow tends to separate (concave up pointing toward outside of the airflow direction). As FIG. 27D shows, when there is a rapid increase and decrease in the inlet and outlet area in the ducting system, the flow tends to separate, forming a trapped vortex inside the ducting system. This phenomenon reduces the cooling efficiency of the radiator and results in higher drag. In the ducting outlet, the flow control nozzle 4110 may be placed to point the energized flow parallel to the concave wall to stabilize the airflow near the surface, reducing flow separation. In the outlet or the location right behind the heat exchanger radiator 424, a small porous wall 4126 may introduce a small amount of bleed air from the cathode exhaust to energize the airflow in the boundary layer and promote attachment of the ducted flow. While the foregoing description and drawings illustrate employing both ram airflow and supplemental cathode exhaust stream flow, either ram airflow or cathode exhaust stream flow may be used by itself.

In another embodiment, the cathode exhaust may be used for active flow control in the ductwork to delay or prevent flow separation, e.g., via boundary layer injections. Other embodiments provide flow control downstream of the radiator.

FIGS. 28A and 28B illustrate duct airflow with flow control (tangential wall jet or porous wall bleed) showing reduced or eliminated flow separation for inlet ducts. A similar principal may be applied to the outlet duct although benefits better manifest for inlet ducts to ensure uniform flow at the heat exchanger core face.

FIG. 29 depicts an integrated hydrogen-electrical engine system 400 of FIG. 23, installed on board an aircraft 4300. While the integrated hydrogen-electric engine system 400 is shown as being installed on the image of the aircraft 4300, parts or all of the system could be installed on the fuselage of the aircraft.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and may be used in a selected embodiment, even if not specifically shown or described. The same may also be varied in many ways. Such variations are not to be regarded as a departure from the disclosure, and all such modifications are intended to be included within the scope of the disclosure. Various changes and advantages may be made in the above disclosure without departing from the spirit and scope thereof.

What is claimed is:

1. A hydrogen fuel cell powered aircraft comprising:
at least one electric motor, and
a hydrogen fuel cell stack configured to power said at least one electric motor, wherein said hydrogen fuel stack includes:
a hydrogen gas inlet, a
hydrogen gas recycling outlet, and
a hydrogen gas recirculation system for the hydrogen fuel cell stack comprising:
   a) first, second and third venturis, and
   b) one or more valves configured to control flow of hydrogen gas to the plurality of venturis, wherein the one or more valves are configured to selectively open and close to optimize flow of the hydrogen gas through the first, second and third venturis through the stages of takeoff and climb, cruise, and descent and landing, wherein the one or more valves are configured to maximize hydrogen gas flow through the first, second and third venturis during take-off and climb, reduce hydrogen gas flow to two of said first, second and third venturis during cruise, and further reduce hydrogen gas flow to one of said first, second and third venturis during descent and landing,
   c) a water separator upstream of the hydrogen gas inlet.

2. The hydrogen fuel cell powered aircraft of claim 1, further including a digital controller configured to control the selective opening and closing of the one or more valves.

3. The hydrogen fuel cell powered aircraft of claim 1, further including a mechanical linkage connecting throttle plates of the plurality of venturis to one another.

4. The hydrogen fuel cell powered aircraft of claim 1, wherein the plurality of venturis are identically sized.

5. The hydrogen fuel cell powered aircraft of claim 1, wherein the plurality of venturis are sized differently from one another.

6. The hydrogen fuel cell powered aircraft of claim 5, wherein the plurality of differently sized venturis are configured to open in sequence from smaller to larger, and vice versa.

7. The hydrogen fuel cell powered aircraft of claim 1, wherein the one or more valves comprise proportional valves.

8. The hydrogen fuel cell powered aircraft of claim 1, wherein the plurality of venturis are connected in parallel.

9. The hydrogen fuel cell powered aircraft of claim 1, wherein the water separator comprises a cyclonic water separator.

\* \* \* \* \*